US 8,406,685 B2
(12) United States Patent (10) Patent No.: US 8,406,685 B2
Giloh (45) Date of Patent: Mar. 26, 2013

(54) SYSTEM AND METHOD FOR INTERCEPTING CELLULAR SATELLITE COMMUNICATION

(75) Inventor: Benjamin Giloh, Moshav Yaad (IL)

(73) Assignee: Elta Systems Ltd., Ashdod (IL)

( * ) Notice: Subject to any disclaimer, the term of this patent is extended or adjusted under 35 U.S.C. 154(b) by 1209 days.

(21) Appl. No.: 11/912,211

(22) PCT Filed: Apr. 20, 2006

(86) PCT No.: PCT/IL2006/000491
§ 371 (c)(1),
(2), (4) Date: Jul. 2, 2008

(87) PCT Pub. No.: WO2006/111975
PCT Pub. Date: Oct. 26, 2006

(65) Prior Publication Data
US 2008/0293355 A1 Nov. 27, 2008

(30) Foreign Application Priority Data
Apr. 20, 2005 (IL) .......................................... 168150

(51) Int. Cl.
*H04B 7/185* (2006.01)
(52) U.S. Cl. ........................ 455/12.1; 455/3.02; 455/427
(58) Field of Classification Search ................. 455/3.03, 455/12.1, 13.2, 98, 427, 404.1, 404.2, 456.1
See application file for complete search history.

(56) References Cited

U.S. PATENT DOCUMENTS

| | | | |
|---|---|---|---|
| 5,892,811 A | 4/1999 | Armbruster et al. | |
| 5,960,324 A | 9/1999 | Mattera | |
| 6,052,560 A | 4/2000 | Karabinis | |
| 6,141,548 A | 10/2000 | Blanchard et al. | |
| 6,278,876 B1 | 8/2001 | Joshi et al. | |
| 6,477,370 B1 | 11/2002 | Sigler et al. | |
| 6,823,185 B1 | 11/2004 | Comer et al. | |
| 7,145,888 B2 * | 12/2006 | Dale et al. ..................... | 370/321 |
| 7,542,716 B2 | 6/2009 | Bell et al. | |
| 2001/0036821 A1 | 11/2001 | Gainsboro et al. | |
| 2004/0014452 A1 * | 1/2004 | Lim et al. ...................... | 455/403 |
| 2004/0185775 A1 | 9/2004 | Bell et al. | |

FOREIGN PATENT DOCUMENTS

| | | |
|---|---|---|
| JP | 06-244783 A | 9/1994 |
| JP | 06-244783 A1 | 9/1994 |

OTHER PUBLICATIONS

Tim S. Yao, "A Re-Programmable Receiver Architecture for Wireless Signal Interception". Proceedings of the SPIE—The International Society for Optical Engineering, Sep. 23, 2003.

(Continued)

*Primary Examiner* — Dominic E Rego
(74) *Attorney, Agent, or Firm* — Browdy and Neimark, PLLC

(57) ABSTRACT

The present invention provides a method for intercepting and monitoring of cellular satellite communication wherein communication between at least one mobile device (MES) and the satellite is through a first band link that includes plurality of first-band spot beams each accommodating at least one basic channel unit that includes a control channel and corresponding traffic channels, and communication between the satellite and main station is through wideband second-band link accommodating plurality of second band spot beams each accommodating at least one basic channel unit that includes a control channel and corresponding traffic channels, the method comprising detecting map between a control channel of the downlink first band link and corresponding control channel of downlink second band link by identifying identical unique spot beam number (SB Mask) data in the respective control channels.

50 Claims, 13 Drawing Sheets

OTHER PUBLICATIONS

ISO 4335—HDLC, http://www.acacia-net.com/wwwcla/protocol/iso_4335.htm, Feb. 27, 2004.

ACeS—ASIA Cellular Satellite, "Enhancing Mobility and Providing Connectivity", Copyright, 2002 Asia Cellular Satellite.

* cited by examiner

SYSTEM AND METHOD FOR INTERCEPTING CELLULAR SATELLITE COMMUNICATION

FIELD OF THE INVENTION

The present invention relates to an apparatus and method for intercepting and monitoring the satellite communication system.

DESCRIPTION OF THE RELATED ART

There follows a brief description of the operation of a prior art network system 8 (that includes satellite 12) with reference to the schematic illustration of FIG. 1.

Thus, the illustrated prior art system 8 transmits and receives messages to and from the mobile devices (MES) 36 through e.g. the L-band link that includes spot-beams 32 and 34 that have been chosen by said mobile 36.

The downlink L-band link communication transmitted through the L band spot beam originates in most cases from the primary gateway station PGW 10 through e.g. C-band link 14 to the satellite 12, and then from the satellite 12 over a specific local spot beam 34 to the mobile 36.

The uplink communication of the MES 36 are transmitted to the satellite 12 over a specific local L-band spot beam 32 and then, from the satellite 12 to the primary gateway (PGW) 10 via a wideband C-band link 16.

When a telephone 28 initiates a call to a MES 36, or being called by an MES 36, the call is conveyed by the public service telephone network 26 to the main switching center (MCS) 24 and then to the PGW 10.

Similarly, when a cellular phone 31 initiates a call to a MES 36, or being called by a MES 36, the call is conveyed by a local cellular transceiver 30 to the main switching center (MSC) 24 to the PGW 10.

When a MES 36 performs a call and asks for an immediate assignment, a procedure known in the art as "channel request" is commenced: the terminal 36 generates and transmits a message on a random access channel (RACH) of the L band link. Said message includes information such as called party number, location of the user terminal (e.g. GPS, MSISDN number), identification of the terminal, synchronization data etc. Said channel request is answered by the system with Access Grant AGCH message which is received in a downlink L band control channel (referred to as BCCH channel). This message includes identification of traffic channel to which the MES 36 switches. The MES 36 and the network establish communication link between them by sending on both sides, every 40 msec and all over eight times, the SABM link command in a time frame of 320 msec. The MES will continue to send messages to and receive messages from telephone 28 through the traffic channel.

The Satellite 12 maps the traffic channel of the L band link to appropriate traffic channel in the C band link. Accordingly, after mapping is accomplished, the communication between the MES 36 and the telephone unit (through the intermediary satellite 12) passes through the so mapped traffic channel in the L band link and the traffic channel in the C band link.

Note that the same mapped L band/C band traffic channels, can convey messages of up to 8 different telephone calls, using 8 Time-Slots in a TDMA format.

This procedure is realized in respect of any telephone call between a MES that communicates through the satellite (using the L band link) and another telephone (say MES or landline telephone) that communicates the satellite through the C band link. Accordingly, messages in respect of plurality of telephone calls are transmitted simultaneously to and from satellite 12, such that messages in respect of each distinct telephone call The satellite network is operable for changing from time to time the mapping scheme of the L-band channels to the C-band channels, such that a given traffic channel in the L band may be mapped to a different channel in the C-band. For a better understanding of the foregoing, assume that a given MES initiated a telephone call to a designated telephone. In accordance with the specified procedure an L band traffic channel is mapped by the satellite to a given C band traffic channel, and the communication between the telephones is transmitted through these channels. When the telephone call terminates and the MES initiates another call, the satellite may map the L-band traffic channel to another C band-traffic channel. Note that in the illustrated prior art network there are e.g. about 6000 channels in the C band link covering a bandwidth of e.g. about 225 MHz.

Intercepting communications transmitted through satellite mobile devices has many applications including, but not limited to, police surveillance applications. For instance in some countries there is a poor cellular or land telephone infrastructure, and accordingly voice and data communication is mainly implemented through satellite mobile communication. Obviously, intercepting and monitoring communications transmitted through the satellite may have important value, inter alia, in tracking conspiracies to commit criminal acts and applying pre-cautions to hamper the acts, to locate wanted individuals which committed criminal or other offenses, etc.

In order to intercept and monitor the specified communications, the actual mapping between L and C channels should be identified. This is not an easy task bearing in mind the large number of C and L channels and the proprietary dynamic mapping scheme (which is not open for public inspection) that is employed by satellite, such as the illustrated prior art network. A naïve approach to map between the channels would be time consuming and inefficient, if applicable at all.

There is thus a need in the art to provide for a method and system for detecting map between L and C channels in an efficient manner.

There is a need in the art to provide for cost effective method and system for detecting map between L and C channels.

SUMMARY OF THE INVENTION

According to one embodiment of the invention, there is provided a method for intercepting and monitoring of cellular satellite communication wherein communication between at least one mobile device (MES) and the satellite is through a first band link that includes plurality of first-band spot beams each accommodating at least one basic channel unit that includes a control channel and corresponding traffic channels, and communication between the satellite and main station is through wideband second-band link accommodating plurality of second band spot beams each accommodating at least one basic channel unit that includes a control channel and corresponding traffic channels, the method comprising detecting map between a control channel of the downlink first band link and corresponding control channel of downlink second band link by identifying identical unique spot beam number (SB_Mask) data in the respective control channels.

According to another embodiment of the present invention, there is provided a method for intercepting and monitoring of cellular satellite communication wherein communication between at least one mobile device (MES) and the satellite is through L band link that includes plurality of L-band channels, and communication between the satellite and main station is through wideband C-band link that include plurality of C-band channels, the method comprising detecting a map between a channel of the downlink L band link and corresponding channel of downlink C band link by identifying identical unique spot beam number (SB_Mask) data in the respective control channels.

A According to yet another embodiment of the present invention, there is provided a method for intercepting and monitoring of cellular satellite communication wherein communication between at least one mobile device (MES) and the satellite is through L band link that includes plurality of L-band spot beams each accommodating at least one basic channel unit that includes a control channel and corresponding traffic channels, and communication between the satellite and main station is through wideband C-band link accommodating plurality of C band spot beams each accommodating at least one basic channel unit that includes a control channel and corresponding traffic channels, the method comprising detecting a map between traffic channels in said downlink C link and downlink L link that correspond to said control channels, including finding an access grant (AGCH) signal at a first timing in said downlink L band and identifying a corresponding traffic channel in downlink C band link by identifying an SABM signal at a second timing that corresponds to said first timing.

According to yet another embodiment of the present invention, there is provided a method for intercepting and monitoring of cellular satellite communication wherein communication between at least one mobile device (MES) and the satellite is through L band link that includes plurality of L-band channels, and communication between the satellite and main station is through wideband C-band link that include plurality of C-band channels, and wherein said satellite maps dynamically a channel in the L band to a channel in the C band, the method comprising: detecting a map between a channel of the downlink L band link and corresponding channel of downlink C band link, irrespective of said dynamic mapping.

BRIEF DESCRIPTION OF THE DRAWINGS

The present invention can be more easily understood and the further advantages and uses thereof more readily apparent, when considered in view of the description of specific embodiments and the following figures in which.

DETAILED DESCRIPTION OF THE PREFERRED EMBODIMENTS

Note that the term mobile device embraces any device capable of communication of audio and or data and or video, through wireless communication medium, including but not limited to mobile telephone satellite device, PDA, etc.

Note the terms channels, frequencies and frequency channels are used interchangeably throughout the description and claims.

Note also that the terms signal and message are used interchangeably.

Figure 1:
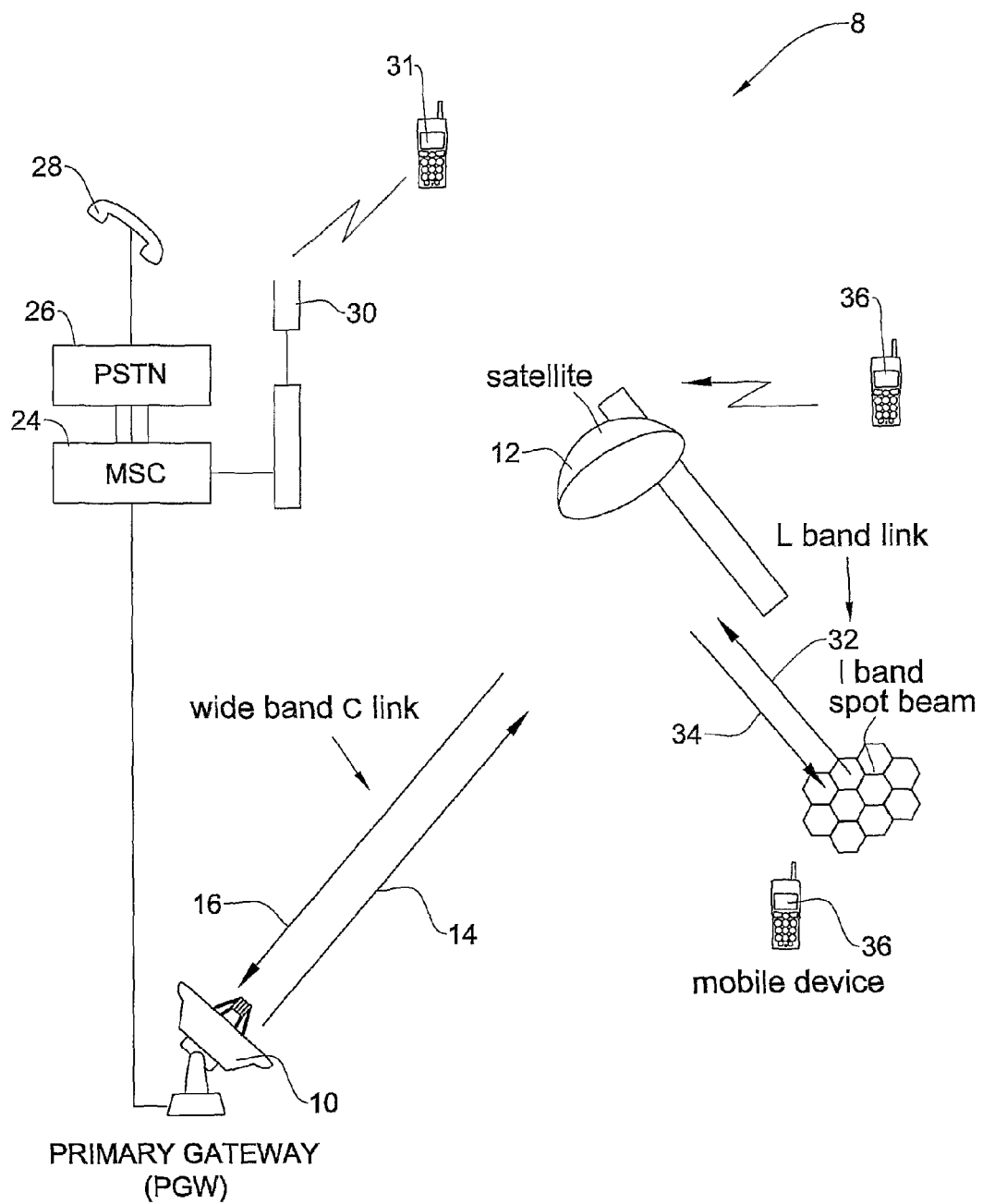
FIG. 1 is a diagrammatical presentation of an illustrated prior art network architecture.
Figure 2:
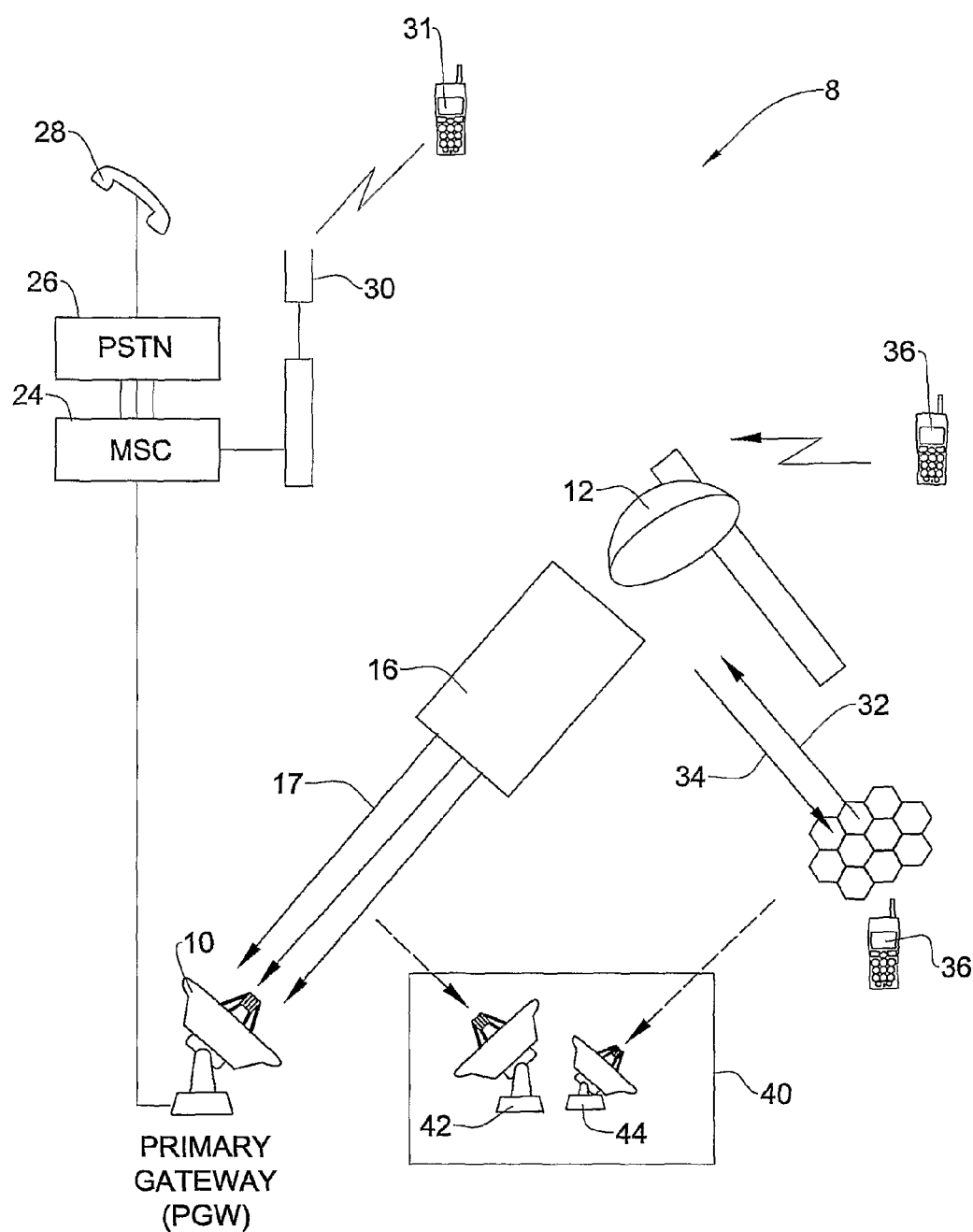
FIG. 2 shows diagrammatically the prior art network and the interception concepts in accordance with an embodiment of the invention.
Figure 3:
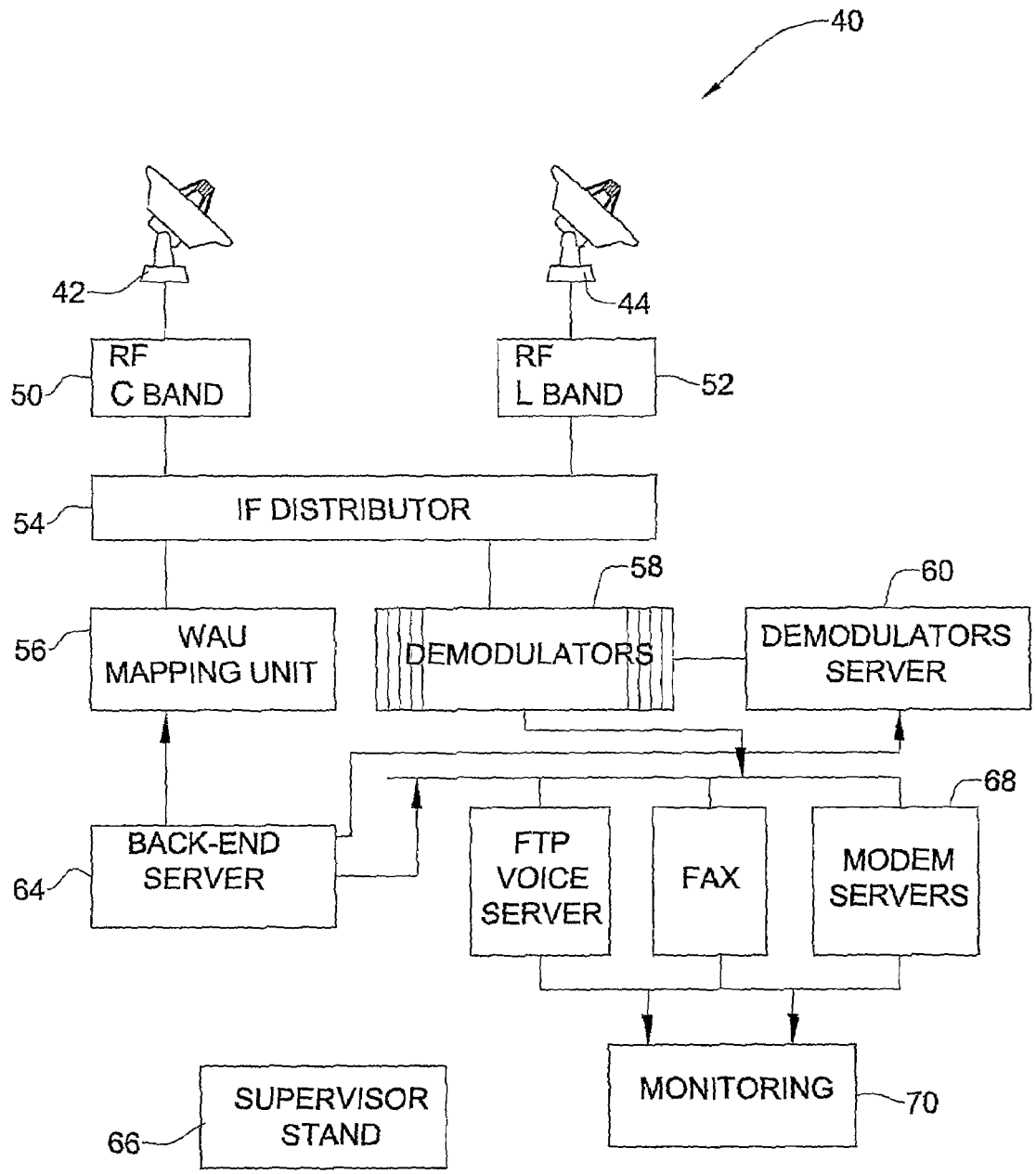
FIG. 3 is a block diagram of the cellular intercept system, in accordance with an embodiment of the invention.

According to an embodiment of the invention, intercepting and monitoring system 40 is shown in FIG. 2 and further elaborated in the block diagram in FIG. 3.

Turning at first to FIG. 2, an RF dish antenna 42 is used to receive a down link C-band transmission 16 from the satellite 12. The downlink C-band transmission 16 is used for transmitting all spot beams frequency channels (coming from uplink L 32) via a single frequency band (referred to as C band link). Note that in the C band link of the illustrated prior art network there are 4 transponders that can carry about 5000 channels extending over a frequency range of 225 MHz.

Another RF dish antenna 44 is used to receive the downlink L-band spot beams 34. By a specific embodiment of the illustrated prior art network, the RF antenna 44 is configured to receive transmissions from several spot beams, usually between 3-7 depending on the geographical area and reused disturbances. Each spot-beam accommodating at least one basic frequency channel unit that includes a control channel and 4 traffic channels. Note that by the specific embodiment of the illustrated prior art network, the channel groups of the spot beams that are received simultaneously by antenna 44 are only part of the 1087 channels that constitute the L band link. Depending on the physical location of the antenna 44 and its orientation different spot beams are received.

The L-band mapping scheme to the C-band is periodically reconfigured by the satellite as a result of the primary gateway station (PGW) 10 O&M commands which are sending from time to time to the satellite.

The L-band channels 34 are mapped to the C-band channels by the satellite according to a proprietary mapping scheme which is not open for public inspection. It is, therefore necessary to continuously re-detect the mapping between the C-band and L band channels in order to intercept both sides of the transmission and thereby being able to monitor the communications transmitted between the telephone unit 28 and the MES 36.

Note that the term communications includes data, and/or voice and/or video.

Reverting now to FIG. 2, since, by this example, the antenna 44 is capable of receiving few spot beams each including few traffic channels where each channel can accommodate more than one call, it readily arises that together with the telephone call between telephone 28 and 36, there may be plurality of other simultaneous calls transmitted through the received (say, 7) L band spot beams.

Turning to FIG. 3, there is shown is a block diagram of the cellular intercept system, in accordance with an embodiment of the invention.

The C-band transmissions in downlink C band received by Antenna 42 are fed to C-band receiver 50 which transmits the signals to the intermediate frequency (IF) distributor 54.

The L-band transmissions in downlink L band received by Antenna 44 are fed to L-band receiver 52 which transmits the signals to the IF distributor 54.

As will be explained in greater detail below, the receiving process in the downlink L band, includes scanning of the channels of the received spot beams (out of the 1087 L-band channels) in order to find the spot beam's frequency control channel FCCH, the Broadcast Control Channel BCCH and the common control channel CCCH, being the uplink control channel.

As shown in FIG. 3, the IF distributor 54 is coupled to a Wide Band Analysis unit WAU 56 where the C-band spectrum is analyzed. By a specific embodiment the WAU is configured to cover possibly the entire C band spectrum (225 MHz) through four transponders. As will be explained in greater detail below, the WAU is a unit capable to perform rapidly and substantially simultaneously analysis of plurality of channels in the down link C band link whilst obviating the need to analyze specifically the content of each channel.

Also shown in FIG. 3 is demodulator server 60 coupled to demodulator unit 58 (accommodating a series of demodulators), which, in turn, is coupled to the IF distributor 54. The demodulators are configured to analyze the content of the C band and L band channels (possibly subsequent to the analysis applied by the WAU), in order to map between the C band and L band channels, all as will be explained in greater detail below. Note that each of the demodulators covers a narrow frequency band and that, due to cost considerations, the number of demodulators in the unit is considerably less than the number required to cover the entire C band spectrum, as well the L band spectrum. The interaction between the WAU 56 and the demodulators unit (58 and 60) gives rise to efficient allocation of the demodulators, enabling to accomplish the detection of mapped C band and L band channels in a cost effective fashion. The interaction between the WAU and demodulator unit is controlled by the AMS and demodulator server (60), as will be explained in greater detail below.

Also shown in FIG. 3, various units 68 which, by this example, comprise FTP voice servers, fax printing units, modem servers etc, receive data transmitted through mapped C/L channels, facilitating the monitoring unit 70, to perform one or more of the following: record and log encrypted voice calls, locating history of target/active MES and the like. The monitoring is not bound by these specific example. For example it may include applying voce analysis (to determine identity of speaker) etc.

Supervisor stand 66 allows the operator to view the position of an active MES, its status identification and data pertains to it. It allows the supervisor to be involved in the mapping and scanning processes and to manually operate and control the system.

In operation, (in accordance with certain embodiment), the signals received from the C-band antenna are transferred from the IF distributor 54 to the Wide band Analysis Unit WAU 56 where the C-band spectrum is analyzed. The analysis includes energy measurement and analysis to find Random Access Control Channels (RACH) in the down link C channel that are prima facie mapped to the CCCH control channel. Based on the analyzed data, a set of demodulators is allocated to the found channels (in the C band) to apply a more fine tuned analysis in order to detect a RACH channel in the downlink C band (a control channel) that is mapped to the BCCH (control channel) in the downlink L band. Other operations of the system of FIG. 3 according to certain embodiments of the invention will be described in greater detail below.

Those versed in the art will readily appreciate that the invention is not bound by the architecture of FIG. 3 nor by the functionality and/or structure of each module/unit depicted in FIG. 3. For instance, the WAU is only one example of a coarse mapping unit and the demodulators unit is only one example of fine mapping unit. By way of another example, the functionality of the supervisor stand may vary, depending upon the particular application.

The specified description referred to a non limiting realization that pertains to the illustrated prior art GSM satellite. The invention is not bound by the specified implementation. Moreover, the invention is likewise applicable to satellites other than the prior art network illustrated herein, such as the Aces. Accordingly, it is noted that the description below with reference to the illustrated prior art network is only an example and may refer to other satellite systems, mutatis mutandis.

Figure 4A:
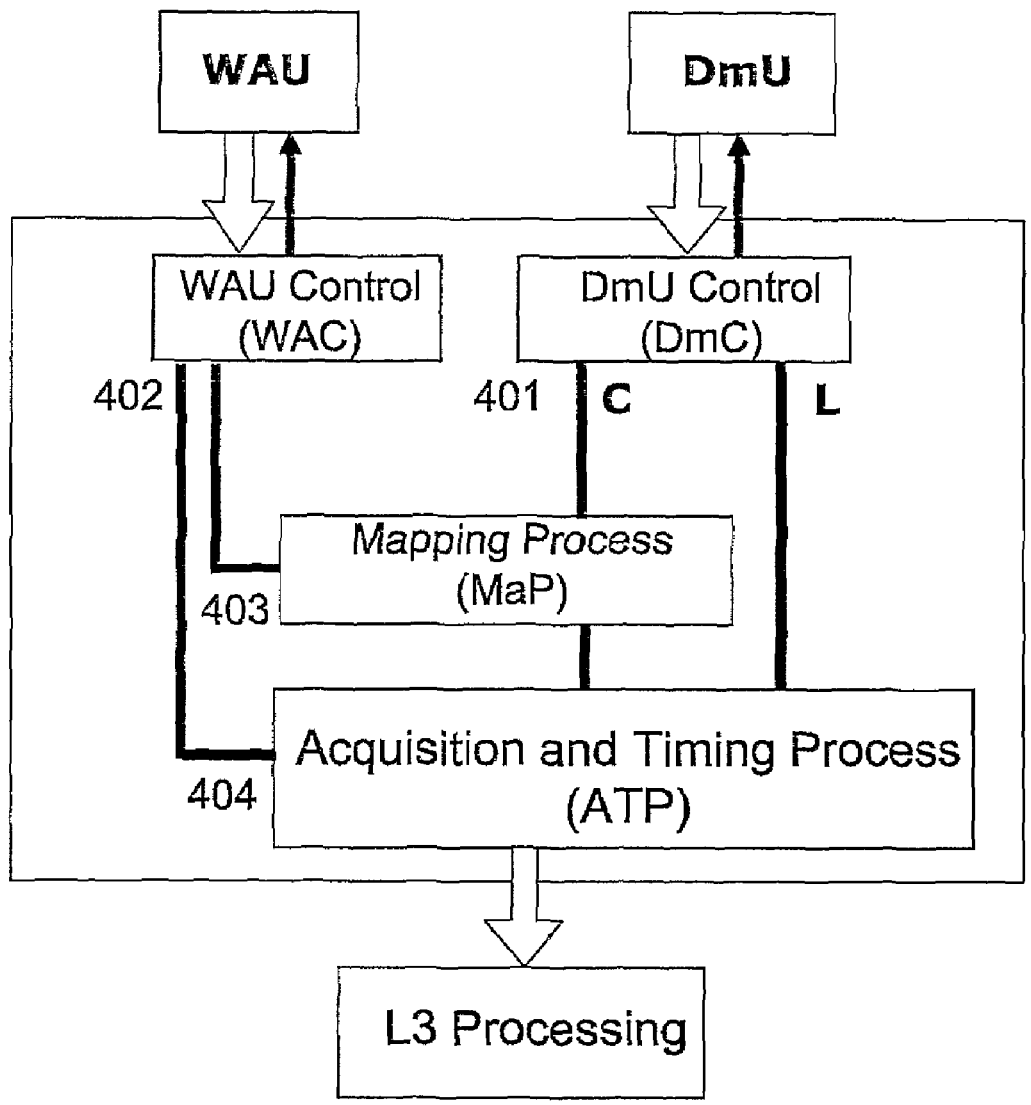
FIG. 4A illustrates a block diagram of a module for mapping the C/L channels, in accordance with an embodiment of the invention.

Before turning to explain a sequence of operation in accordance with an embodiment of the invention, attention is drawn to FIG. 4, illustrating a block diagram of a module for mapping the C/L channels, in accordance with an embodiment of the invention. Thus,

401 DmC—Demodulation Unit Control:

Controls demodulation boards' allocation in the DmU is according to the automatic operations of the AMS server and the policy issued by the Supervisor (66). The AMS controls the demodulator unit (DmU) and the WAU unit via its DmC and WAC subunits respectively. In normal operation, while all the related frequencies of the target spot-beams are known (Both in C and L bands), its main functionality is to rearrange the GMR 1 messages in the right order (as they are intercepted just in the L band), and sends them to the backend sever (64) for further processing. In case that the related C band frequencies of the uplink L band are unknown, the AMS enter to its mapping mode and performs specific operation in order to find and map the appropriate C band to L band frequencies. All these operations are done by the following AMS subunits.

402 WAC—Wideband Analysis Unit Control:

Controls WAU activities. Receives requests from MaP and ATP, and returns analysis information from the WAU.

403 MaP—Mapping Process:

Responsible for C-band mapping. Receives messages from the DmU, and either adds mapping information to them and forwards them to the ATP, or initializes a new mapping procedure and then forwards the newly-mapped messages to the ATP. Also, controls routine scanning of C-band RACH frequencies.

404 ATP—Acquisition and Timing Process:

Responsible for acquisition of all L-band and C-band messages. ATP converts the format of these messages (converts C band messages to an Uplink L band messages) and sends them in the right order to the L3 Messages Processing unit. Uses BCCH information to establish coverage of all L-band channels. Uses BCCH and the Sync bursts information to determine current system timing (frame number and Time stamp). For each received message from the DmU or MaP, converts the frequency and timeslot header information to manageable channel information, and the timestamp to frame number. AGCH and SABM messages are exceptional, and forwarded first to the MaP for mapping purposes.

Figure 4B:
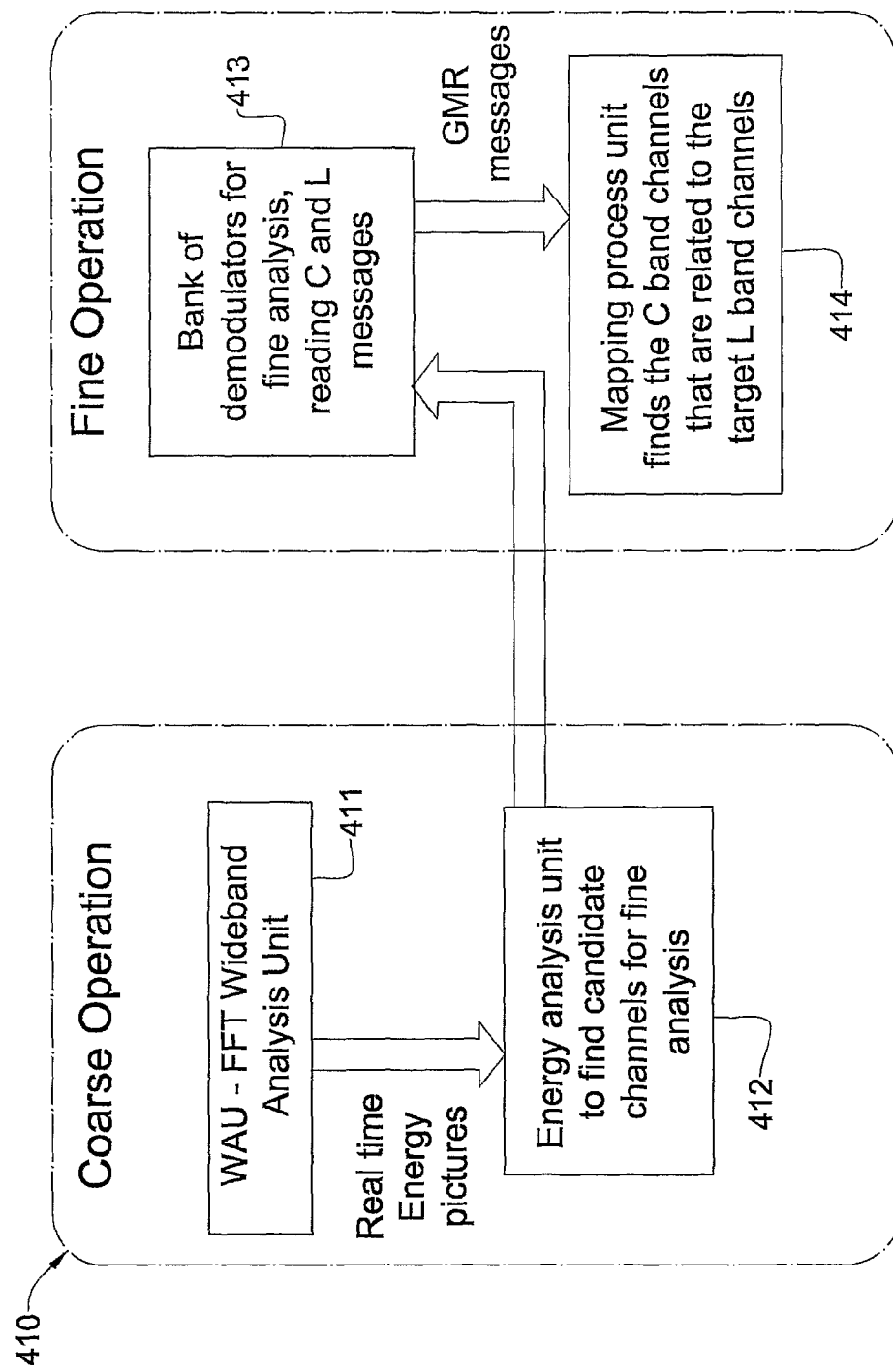
FIG. 4B illustrates a generalized block diagram of a coarse and fine operations, in accordance with an embodiments of the invention.

Before turning to a description of a detailed flow chart, attention is drawn to FIG. 4B illustrating a generalized block diagram of a coarse and fine operations, in accordance with certain embodiments of the invention. In accordance with certain embodiments, the coarse and fine operations are controlled by AMS module 60. Thus, in accordance with certain embodiments, the WAU unit 411 (see also 56 in FIG. 3), uses known per se FFT widwband analysis unit for obtaining coarse analysis (based on energies) (412) in order to identify, e.g. candidate SABM channels (as will be explained in greater detail below). Having identified candidate SABM channels appropriate control command triggers the "fine operation" sequence which calls for (by these particular embodiments) to allocate modulators from a bank of modulators (413) for analyzing the content of the candidate channels and obtain appropriate L/C mapping (414).

Figure 5A:
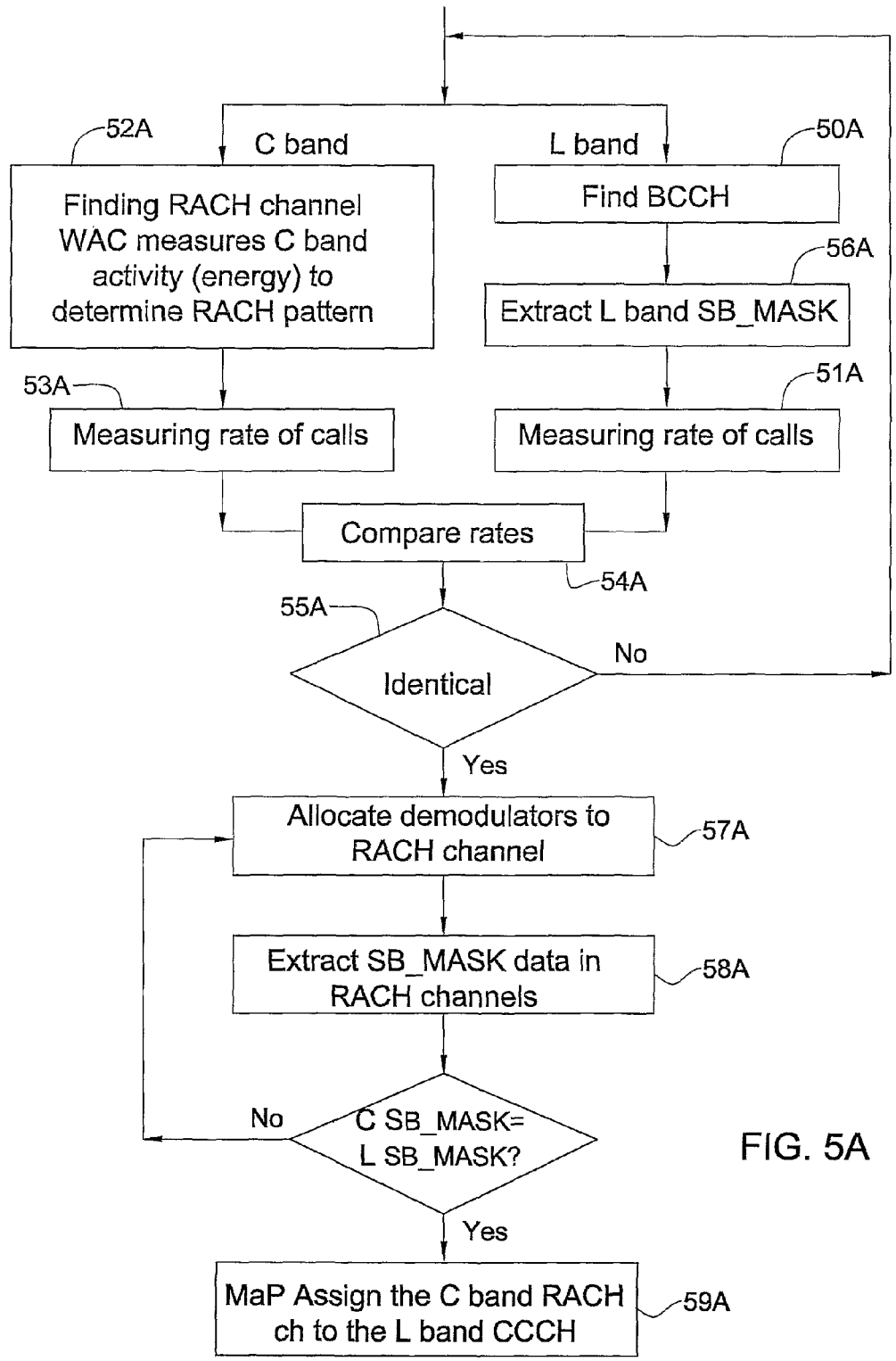
FIGS. 5A-B illustrate a flow chart showing schematically a sequence of operation, in accordance with an embodiment of the invention.

Bearing this in mind, attention is now drawn to FIG. 5A, showing a flow chart illustrating schematically a sequence of operation, in accordance with an embodiment of the invention.

As shown, L band transmission (as received in antenna 52, see FIG. 3), is received and appropriate demodulator is allocated to the downlink L band transmissions (including, as recalled, few L band spot beams) for finding in a known per se manner the Broadcast control Channel (BCCH) 50A. Next the rate of calls is measured (51A), by counting the number of access grant signals (AGCH). Note that each AGCH signal signifies a grant submitted from the satellite (12 of FIG. 2) for a request (RACH message) to establish a call. Accordingly, a BCCH control channel is found and the rate of calls is measured in the downlink L band.

In the downlink C band link, the RACH channels are traced. As may be recalled each MES that attempts to initiate a call submits a Random Access Control (RACH) request in an uplink L channel. Since communication in the uplink L band cannot be intercepted, there is a need to intercept the RACH requests in downlink C band channels. Once the candidates for RACH channels are found, and the rate of calls is measured (according to calculated number of RACH messages) a map can be established between the CCCH (control) channel in the uplink L band and a RACH channel in the downlink C band, based on identical or nearly identical rate of calls. In order to find the RACH channels in the downlink C band it would have been desired to allocate demodulators to each C band channel and to trace a RACH message pattern, which has known per se characteristics. Since, however, there are numerous C band channels and in accordance with certain embodiments of the invention considerably less number of available demodulators, a first coarse analysis is performed. To this end, a coarse mapping unit, such as Wideband Analysis Unit (WAU) (which, in accordance with one embodiment, is based on a collection of spectrum's energy pictures done by FFT technology, which is implemented inside the WAU unit is applied simultaneously to a plurality of downlink C band channels and is able to find RACH channels by measuring C band activity and more specifically energy of data transmitted through the channels. Based on the measured energy, pattern of RACH signals (requests) can be determined. For instance, a RACH signal has a duration of 15 msec and this can be determined in a known per se manner in response to the measured energy.

Reverting now to FIG. 5A, the WAU is applied to the downlink C band channels and the WAU (see 402 in FIG. 4) measures the energy for determining RACH pattern 52A. Having determined the RACH pattern, rate of calls can be measured by simply counting the number of RACH requests (53A). as also shown in FIG. 5A, a BCCH channel is located in the L band (50A) and after having found BCCH channel, SB_MASK data is extracted (56A), and subsequently, rate of calls can be measured (51A). Now, the number of calls as measured in the BCCH is compared (54A) to those measured in the RACH channels, and in the case of substantially identical result (55A), this means that a control channel in the L band (the BCCH) and possibly few candidate control channels (hereinafter candidates RACH) in the C band match.

Next, it would now be required to detect the exact control channel in the C band (from among the specified candidates RACH channels) that is mapped to the BCCH channel in the L band. Note that the latter procedure (for detecting candidate RACH channels) was applied within a short time interval substantially simultaneously to numerous C channels using the WAU (e.g. fast FFT units) whilst obviating the need to analyze explicitly the content of each C channel.

In accordance with certain embodiments of the invention, the unequivocally mapping between the L band and the C band control channels (from among the candidates RACH) is determined based on identical spot beam number (SB-MASK) extracted from the matched L band channel and C band channels. To this end, demodulators are allocated to the candidate RACH channels (57A) and the content of the data (such as, e.g. reason for the call, priority, service provider identity, GPS location etc.) transmitted through the channels is analyzed to extract SB_MASK (58A), being unique to each spot beam. Now, the SB_MASK extracted from the RACH (58A) and the SB_MASK extracted from the BCCH (see previous step 56A) are compared for identity (501A), and in the case of identical SB_MASK data extracted from the BCCH (56A) (in downlink L band) and from RACH (in downlink C band) (58A), the respective channels are announced as mapped control channels (59A). In the case of mis-match, another round of allocation of demodulators is effected (57A).

Figure 6:
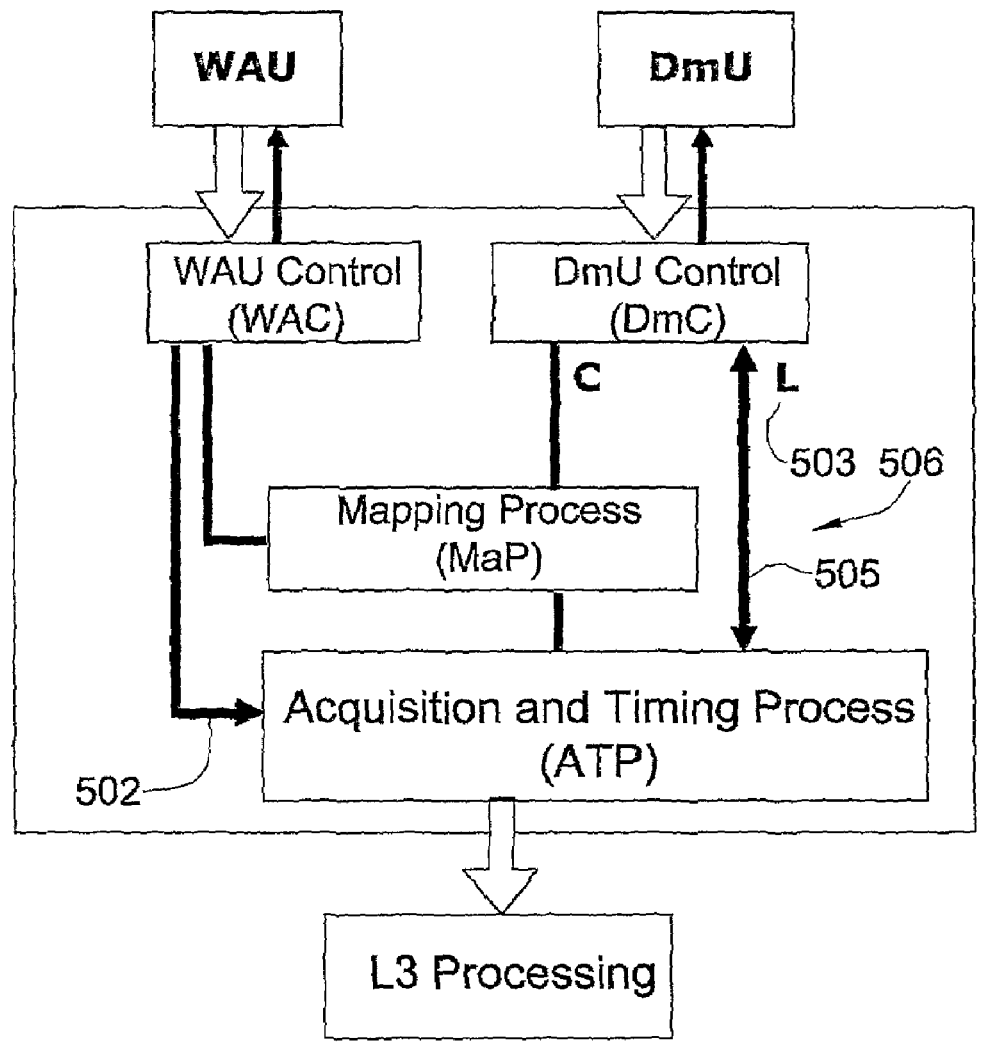
FIG. 6 illustrates an L-band processing, in accordance with an embodiment of the invention.
Figure 7:
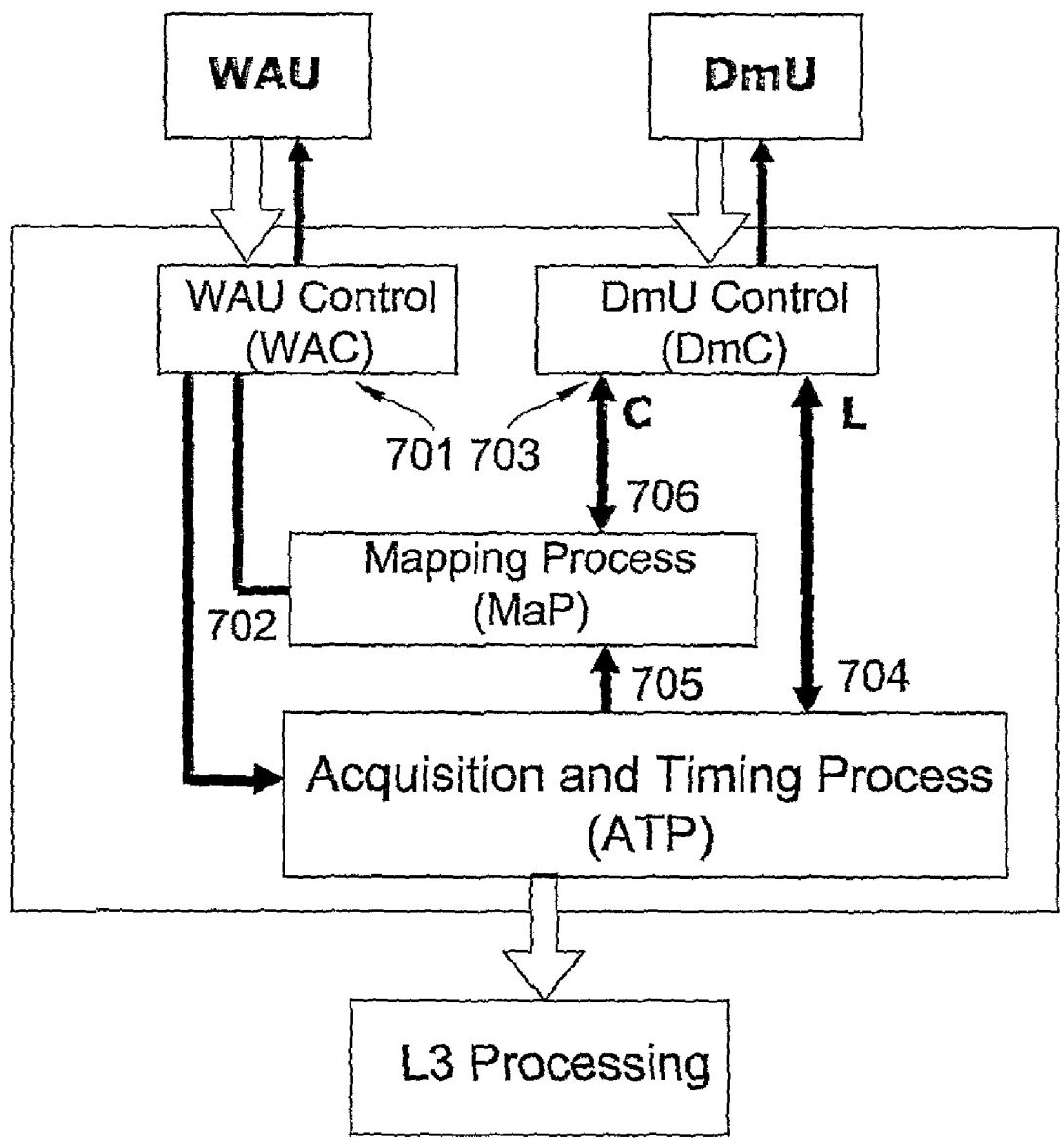
FIG. 7 illustrates a C-band processing, in accordance with an embodiment of the invention.

The control channel mapping described above will now be further described with reference FIGS. 6 and 7 illustrating an L-band processing, and C band processing, in accordance with an embodiment of the invention. This embodiment will also refer to the architecture of FIG. 4.

501 ATP (404 in FIG. 4) Initiates L-Band Processing
    502. ATP Receives FCCH frequency and timing from WAU
    503. ATP Requests allocation of demodulation board to BCCH frequency
    504. DmC allocates demodulator to BCCH. BCCH allows to measure rate of telephone calls, which will later assist in identifying corresponding channel in the C band based among the other on estimated similar rate of telephone discussion.
    505. BCCH Information received from L-band
    506. ATP processes BCCH information, and requests resource allocations for additional BCCH and CCCH frequencies, according to coverage priorities. This is required since it may be the case that there may be more than one basic channel unit, (each consisting of control channel and few traffic channels) in the same spot beam. In the latter case, additional BCCH are searched. For instance, in a busy spot beam, there may be two or more control channels (BCCH).
    Note that all BCCH within the same spot beam have the same spot-beam number (SB-MASK).
    507. ATP processes BCCH information to extract timing information (frame number) for each spot beam
    ATP continuously monitors BCCH information (channel configuration and timing). This is required inter alia for the reason that it serves for detecting access grant AGCH signals (which serves, inter alia, for measuring call rates).

The net effect would be that on the basis of the so detected BCCH signals the rate of telephone calls in the downlink L band channels is known.

It may be recalled that by this embodiment the MES transmits a RACH signal in the uplink L band, which signal is detected in downlink C band. Thus, 701. MaP initiates C-band mapping, by requesting allocation of demodulation boards to C-band RACH frequencies.

702. MaP receives RACH activity statistics from WAU, and thus determines mapping priority for various RACH frequencies (based on measured energy and consequently RACH pattern. The MaP allocates demodulator boards for those frequency channels that the RACH activity rate is similar to the AGCH activity at the L-band target spot beams. It may happen that several C-band RACH frequencies will be at the same rate and therefore the MaP will allocate multiple demodulators simultaneously to these channels.

703. MaP requests deallocation and reallocation of demodulation boards to RACH frequencies, according to timeout parameters, repeatedly scanning all unmapped RACH frequencies. Note that unmapped (rather than mapped) RACH data is of interest, since, obviously, RACH (in the downlink C band channel) that is already mapped to BCCH (in the downlink L band channel) does not require further processing for determining C/L mapping. Note also that the Map module is already aware of the rates of calls as derived from the BCCH signals (and provided to the Map module by the ATP module—see FIG. 5A above), and is therefore capable of measuring corresponding rates of calls (i.e. measured rate of RACH requests) in the downlink C band channel. The candidates RACH for mapping are those with rate of calls identical or nearly identical to the measured rate of calls in the BCCH.

This enable to determine first coarse mapping between RACH and BCCH. The stages below illustrate how to determine the exact mapping based on SB-Mask data.

704. BCCH messages are received from the L-band and passed from the DmC to the ATP 705. ATP extracts spot beam center location and SB_Mask parameters from the BCCH, and passes them to MaP. In other words, the ATP extracts the SB_Mask signal from the BCCH and delivers them to the Map module.

706. RACH message (channel request) is received from each of the unmapped RACH frequencies in the C-band and passed from the DmC to the MaP 707. MaP extracts GPS position and SB_Mask parameters, and determines whether RACH belongs to a target spot beam by comparing them to the data received from the ATP. In other words, the SB-Mask from the BCCH is compared to the SB-Mask of the candidate RACHs, and in the case of match the RACH/BCCH mapping (indicative of control channels corresponding downlink C band and downlink L band) is determined.

708. If RACH is relevant (i.e. for the matching RACH), MaP extracts and records data from RACH such as Random Reference, Establishment Cause, which enables to relate the specific RACH (The user specific request in the C band) to the specific user AGCH (in AGCH there are messages for all the active users and there is a need to identify what is the request and response for every specific user). The GPS data indicates on the precise geographic location of the MES and as such may have significant surveillance value, e.g. for tracking purposes (for instance tracking a wanted person who uses MES for communication).

In other words, in accordance with the embodiment as described with reference to FIGS. 6 and 7, the detection of mapped control channels (of downlink C band control channel and downlink L band control channel) has been accomplished based on SB_Mask data.

The next step would be to wait for AGCH that corresponds to the RACH. This is required since the satellite will "approve" the RACH request (as submitted by the MES and intercepted in the downlink C channel [see FIG. 5A, above]) by sending to the MES in the BCCH (downlink L) an Access Grant (AGCH) signal indicative that the request has been approved. In addition the AGCH includes indication to what traffic channel to switch.

There is a need to verify that the AGCH is matched to a specific RACH message. For instance, there may be, say, three identified RACH messages in the same RACH channel, as intercepted in the downlink C channel. These three RACH messages are indicative of requests to establish three distinct telephone calls, respectively. It would be desired to identify the RACH message that matches the AGCH since the former would include details of the MES. The matching procedure is based on comparing the Request Reference data that is unique to each user RACH request. Establishment Cause provides the information to the reason for the request (for example Paging) and a GPS Discriminator (parameter that exists in the AGCH and is derived from the actual GPS with CRC operation) provides the location matching. In addition to this, the AGCH includes designation of the Traffic Channel (in the L band) that the MES would switch to (from the AGCH control channel). The traffic channel serves for conducting the actual transmissions between the MES and the satellite (both in uplink and downlink L directions). Corresponding RACH and AGCH have the same, so called, request reference data.

Figure 5B:
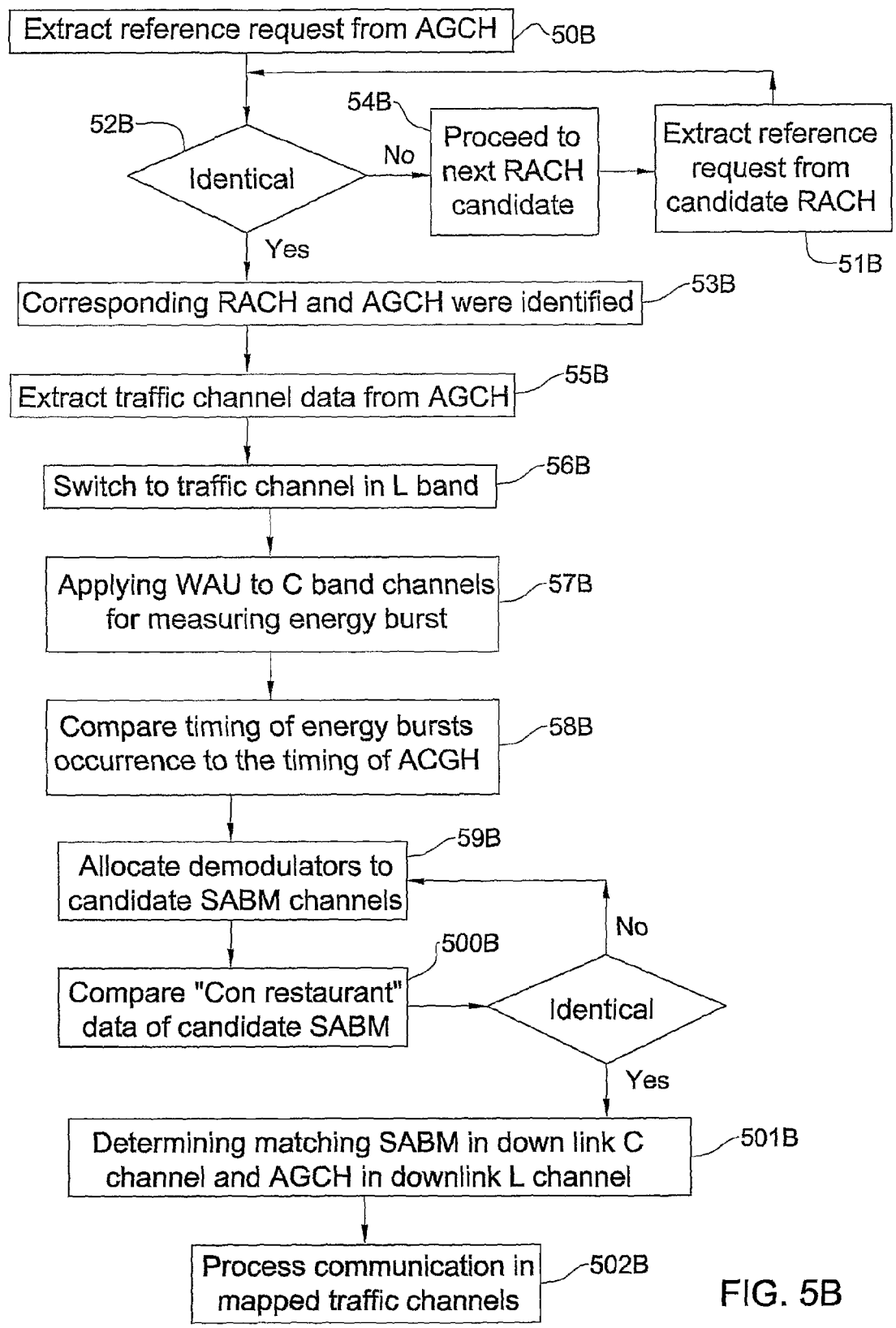

The procedure in accordance with an embodiment of the invention as illustrated in FIG. 5B, includes extracting the Request Reference parameter from the AGCH (50B) and from a candidate RACH message (51B), and the corresponding pair of RACH message and AGCH are those with the same request reference (52B and 53B). In case of discrepancy between the reference request of the AGCH and a candidate RACH, next candidate RACH is evaluated (54B).

Now that control channel are mapped, i.e. the mapped C and L channels that are associated with the identified RACH and the AGCH signal, as described above). Next, the characteristics of the MES are available, based on RACH extracted data, such as GPS.

Having mapped the control channels, it would be possible to detect mapping between corresponding traffic channels through which the actual communication is transmitted between the mobile device and the other communication device (say, telephone 28 and MES 36).

The detection of the mapping between the traffic channels will now be described in accordance with certain embodiment and with reference to FIG. 5B. Thus, the traffic channel in the L band (for both the uplink and downlink) is extracted from the AGCH message (55B). This data would allow the MES to switch from the control channel to the traffic channel (56B). Note that by this example, the BCCH and AGCH are in the same control frequency channel and in time-slot 0 but in different frames.

Next, it would be desired to detect the corresponding traffic channel in the downlink C band. Note that whilst the control channel in the C band has been detected (based on analysis of the RACH signal, as described above) it is not guaranteed that the satellite would allocate a traffic channel that forms part of the same basic channel unit as that of the RACH control channel. Accordingly, the proprietary mapping scheme of the satellite may map any traffic channel from among the numerous C traffic channels.

As specified above, once the MES 36 establishes communication (in response to receipt of AGCH and switching to the L band traffic channel), the procedure of TCH link establishment between the MES and the Primary Gateway is started. The MES sends 8 times, every 40 mSec, asynchronous balanced mode (SABM) message in a time frame of 320 mSec. For each message it gets SABM message response from the Primary Gateway. This message is used to find the appropriate C band TCH channel.

Thus, in order to detect mapped traffic channel it would be desired to identify the SABM transmissions that originated from the MES (in response to the AGCH) and to apply a criterion in order to determine whether the SABM corresponds to the AGCH.

In accordance with certain embodiment, there are not sufficient demodulators to allocate to each and every possible traffic channel in the downlink C band in order to identify the sought SABM signal and accordingly a first coarse analysis is performed. To this end, a coarse mapping unit, such as the Wideband Analysis Unit (WAU), which, in accordance with one embodiment, provides wideband energy picture (of every transponder in the C band), based on its high resolution FFT technology. These energy picture is applied simultaneously to a plurality of down link C band channels, in a rate that enable to identify bursts activities. Thus the WAU provides us a precise energy picture of the C band link. The criterion of finding the appropriate TCH channels includes identifying at least one channel in which the respective energy burst is at a timing substantially identical to the timing of the (AGCH) signal.

Reverting now to FIG. 5B, the WAU is applied to the downlink C band channels for measuring substantially simultaneously energy bursts 57B.

Next, the timing of the bursts is compared to that of the AGCH. All those channels having energy burst timing that is substantially identical (close within predefined timeslot) are candidates (hereinafter candidate SABM channels) for conveying the sought SABM message. (58B). Note that the latter process is rapid and does not require explicit analysis of the contents of the data transmitted through the channels. Now, it would be possible to allocate demodulators to the candidate SABM channels (59B) in order to analyze the contents (con restaurant—as will be explained in greater detail below) and identify the appropriate SABM message and consequently identify the corresponding traffic channel in the downlink C channel. As may be recalled, according to the protocol, in response to receipt of AGCH, an SABM is transmitted 8 times. It is accordingly appreciated that the timing of the AGCH and the subsequent SABM is very close and this exactly what was checked in the stage 58B.

The appropriate SABM message is identified based on "Con Restaurant" parameter that actually identifies the user in the SABM procedure and exists in both sides messages (the SABM message from the MES and the SABM message from the Gateway). This test requires analyzing of the content of the SABM candidate channels, mainly the Con Restaurant parameter, which is feasible after having been allocated the demodulators to the candidate SABM channels. Note, incidentally, that whilst the latter fine analysis of the content of the channels is considerably more tedious than the preliminary coarse analysis of the energy bursts using the WAU (57B), it is applied to only few channels (the candidate SABM channels) and, accordingly, a fine mapping unit (e.g. limited number of demodulators) can be used. In this connection, it is noteworthy that in accordance with certain embodiments up to 70 demodulators are used, considerably smaller than the few thousands available C band channels.

Bearing all this in mind, attention is drawn again to FIG. 5B. As shown the "con restaurant" message of the candidate SABMs enables to match the L band TCH channel to the appropriate C band TCH channel. Thus, in 500B, the con restaurant message from both SABMs is compared and in the case of match the respective traffic channels are mapped (501B). In the case of mis-match control is transferred again to 59B in order to allocate demodulators to other candidate SABM channels. Having found the corresponding SABMs in the downlink L and C channels, the channels which convey the respective matching SABMs are indicated as the mapped traffic channels in the L and C band.

Now, it would be possible to process the communication transmitted through the traffic channels (502B), such as decryption demodulation, and/or any content related processing (e.g. voice analysis context related analysis, analyzing data that pertains to certain topic or subject, etc.). This would allow to monitor the communication transmitted between the MES and the other communication device, for the desired application.

Attention is now drawn to FIGS. 8 to 10, describing a mapping sequence (in accordance with certain embodiment) as described with reference to FIG. 5B above, with reference also to the architecture of FIG. 4.

Figure 8:
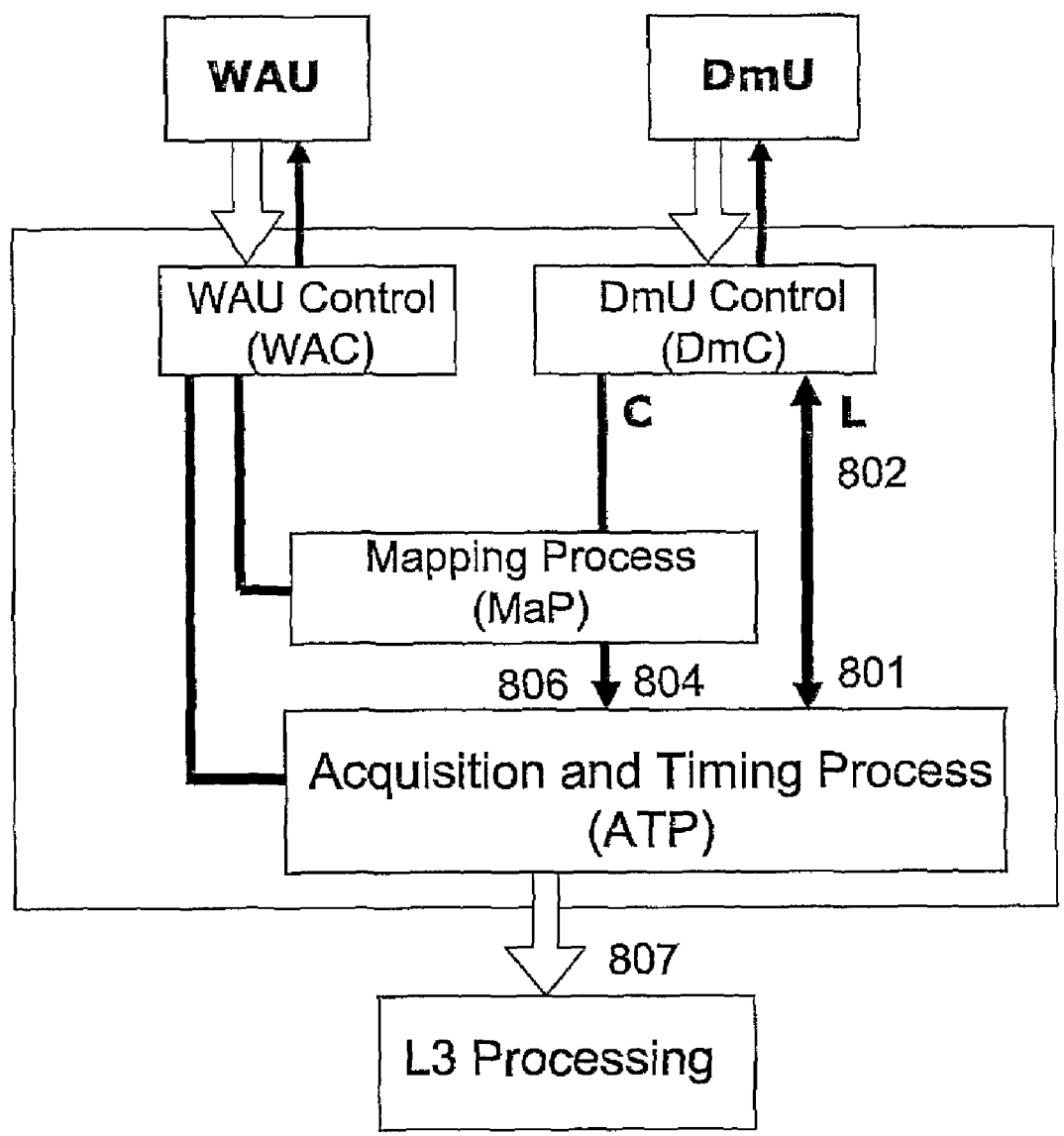
FIG. 8 illustrates a mapping sequence, in accordance with an embodiment of the invention.
Figure 9:
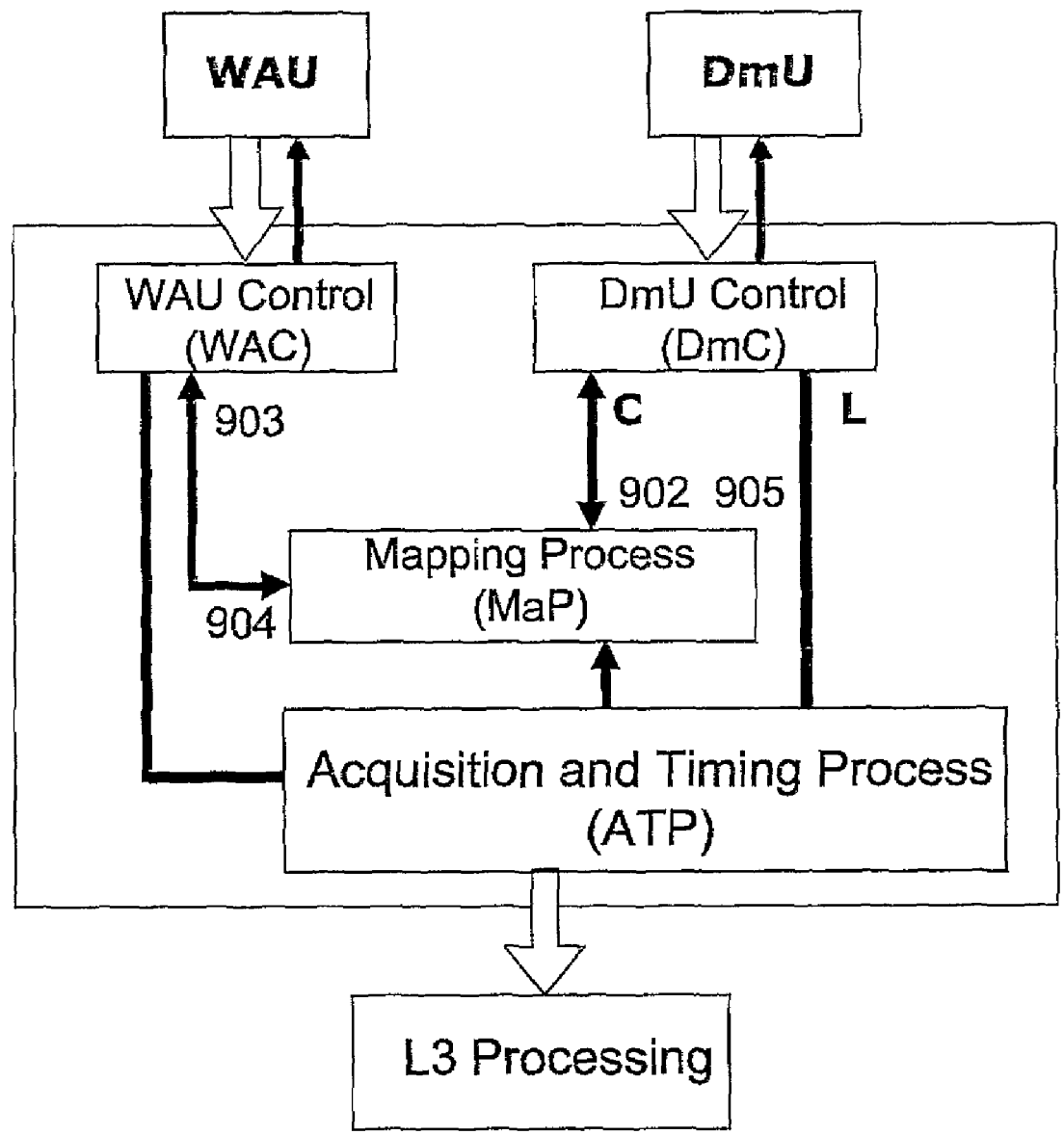
FIG. 9 illustrates a mapping sequence, in accordance with another embodiment of the invention.

Turning now to FIG. 8, there is shown a C-band mapping sequence, in accordance with an embodiment of the invention. By this embodiment corresponding RACH and AGCH messages are found. Thus,

801. AGCH message is received from an L-band BCCH frequency and passed from the DmC to the ATP.

802. ATP requests allocation of demodulation board to the traffic channel frequency indicated by the Immediate Assigmnent message (i.e. request from the network). This means that the traffic channel data is extracted from the access grant (ACGH). The traffic channel indicates the channel in the basic channel unit to which the MES will be switch from the control channel. Note that the switch to the traffic channel is not as yet performed.

803. ATP extracts from the message the frame number. ATP then calculates the timestamp corresponding to that frame number.

804. ATP passes the AGCH message to the MaP, along with its timestamp), and along with request reference parameter of the AGCH.

805. MaP extracts the request reference parameters from the AGCH message, and correlates it to its stored RACH messages (based on request reference parameter of the RACH). If there is a match, MaP maps the RACH frequency to the AGCH frequency. Consequently, the mapping between the RACH and the AGCH has been accomplished (based on request reference parameter). In addition, the RACH messages are sorted according to the time stamps (see 806 below).

806. MaP passes both RACH and AGCH messages to ATP, with timestamp and uplink/downlink L-band frequency and timeslot number

807. ATP performs normal operation with RACH and AGCH messages (in that order): looks up corresponding frame number and originating downlink/uplink channel, and outputs the messages with these parameters. The data of the RACH and the corresponding ACGH is passed to the L3 module for further processing.

Note incidentally, that the L3 processing can process the data in the usual way, as it was intercepted directly from the downlink and uplink L band directions.

Having identified correspondence between RACH and AGCH messages, there follows a description of a mapping sequence, in accordance with an embodiment of the invention. Note in the description below, correspondence between the AGCH and SABM messages is identified and mapping between a traffic C band channel and traffic L band channel is detected.

The general idea is to trace the AGCH signal in downlink L band, extract there from the traffic channel data and map a corresponding traffic channel in the downlink C band, based on SABM signal that is transmitted at substantially the same timing as the one that the AGCH signal was detected. Note that this is performed in the case that the mapping between the traffic channels (in the downlink C and downlink L bands) is not a priori known. The description with reference to FIG. 9 illustrates a coarse (and fast) procedure for identifying candidate SABMs in accordance with certain embodiments, and the description with reference to. FIG. 10 illustrates a more specific (and slow) procedure for mapping L/C channels based on content analysis, in accordance with certain embodiments. Thus, turning at first to FIG. 9,

901. When receiving an AGCH message, the MaP checks whether the allocated L-band traffic channel frequency is mapped (independently from RACH-AGCH mapping)

902. If it is mapped, the MaP requests allocation of a demodulation board to the corresponding C-band traffic channel frequency, and the mapping procedure is done. This means that the MES switched to the traffic channel in the L band and communication is processed in the downlink L channel. In addition, communication in the downlink C band is processed, thereby monitoring the communication between the MES and the other communication device (e.g. MES 36 and telephone device 28 of FIG. 2)

903. If it is not mapped, the MaP examines the timestamp of the AGCH message, and requests from the WAC a list of all traffic frequencies (in the downlink C band) which were activated during a specific time-window since that timestamp, in the timeslot specified in the channel assignment.

904. WAC examines C-band activity (by identifying energy bursts within the specified timeslot), and logs and returns a list of activated frequencies.

905. MaP requests allocation of demodulation board to each frequency on the list (in groups or one-by-one), and stays on each frequency one frame period (40 msec)— just long enough to receive an SABM frame, if one was transmitted there. Note that by this embodiment the SABM is transmitted 8 times consecutively. Thus, at a first stage, candidate SABM traffic channels in the downlink C band are identified (see 903,904, above) and to these candidate channels demodulators are assigned to intercept the SABM signal which is transmitted 8 times consecutively. Once the Con Reference parameter of both sides is identical in a given SABM traffic channel (from among the candidate SABM channels) the latter is mapped to the corresponding channel in the downlink L band.

Figure 10:
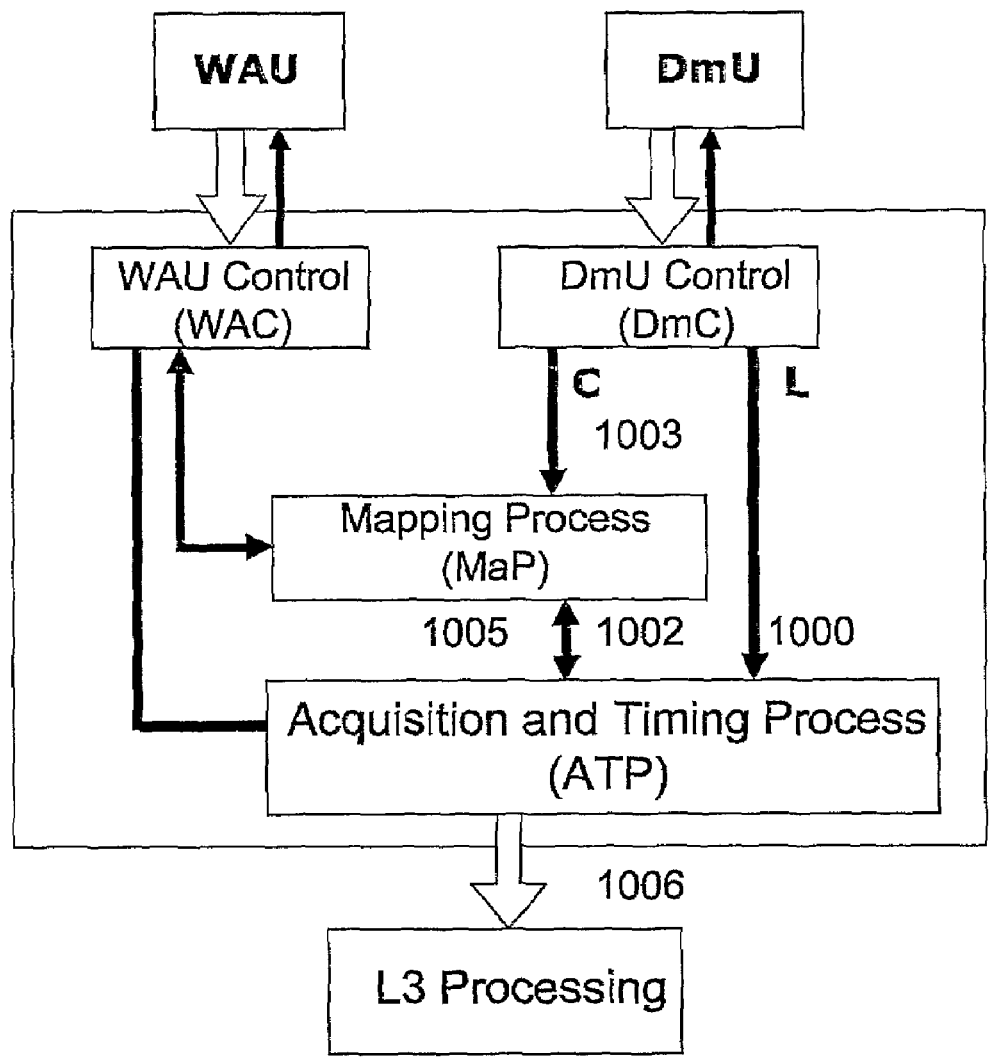
FIG. 10 illustrates a mapping sequence, in accordance with another embodiment of the invention.

Having identified correspondence between the AGCH and the SABM messages, there follows a description with reference to FIG. 10, illustrating a mapping sequence, in accordance with an embodiment of the invention. By this embodiment, assuming that SABM signals are available both in the downlink C band and in the downlink L band, there follows a procedure how to identify corresponding SABMs based on information field (more specifically "con restaurant") in the respective SABMs, and in the case of match the corresponding traffic channels are mapped. Thus,

1001. SABM frame is received from the previously allocated L-band traffic channel

1002. ATP passes the SABM frame to the MaP, along with timestamp and originating frequency (in the L band) and timeslot.

1003. SABM (candidate) frames are received from some of the scanned C-band frequencies.

1004. MaP compares the information field (Con restaurant) of each received SABM to the information field of the SABM provided by the ATP. If there is a match, the C-band traffic channel frequency is mapped to the L-band traffic channel frequency.

1005. MaP passes both SABM frames to ATP, with timestamp and uplink/downlink L-band frequency and timeslot number

1006. ATP performs normal operation with both SABM frames (first uplink SABM [i.e. downlink C] and then downlink L SABM): looks up corresponding frame number and originating downlink/uplink channel, and outputs the messages with these parameters.

After having described how to detect mapping of traffic channels it is recalled that, the satellite re-maps C/L channels in accordance with proprietary switching scheme.

Thus, when RACH channel is found in the downlink C channel (in the manner describe above), it is likely that a RACH message that stems from subsequent call (issued by the same MES telephone) will be transmitted through the same RACH channel, allowing the system, (using the demodulator allocated to this channel), to apply the identification of RACH/AGCH and subsequently the detection of mapped traffic channels in the manner described above.

However, it is likely that at a certain unpredictable timing, the satellite will re-map the C/L channels (using the dynamic mapping scheme) and accordingly new RACH messages initiated from the same MES (indicative of initiating new calls) will be transmitted through different downlink C channel than the one currently monitored by the demodulator. Since there are only few demodulators allocated to channels in the C band (compared to the total number of channels in the C band), there is high likelihood that there is no demodulator allocated to the C band channel through which the new RACH message is transmitted. The net effect would be the next call may be missed since the triggering RACH message will not be spotted. This loss of call (and possibly other future calls) may have undesired consequences. For instance, if the MES under consideration is used by an individual who is under close surveillance, it would be highly desirable to intercept monitor also his future calls (as long as required).

In accordance with certain embodiments, this situation may be avoided. Thus, as may be recalled, the RACH message is followed by AGCH. The latter is transmitted through the same BCCH frequency channel in the downlink L band, and the likelihood of "losing" the BCCH channel is negligible. Accordingly, when an AGCH message is found and corresponding RACH signal has not been identified in the currently monitored C band channel, it is assumed that the lost of the RACH is due re-map procedure of the satellite.

Based on this understanding, the processing described with reference to FIGS. 5B, 9 and 10 (in accordance with not limiting embodiments of the invention), can be applied in order to find corresponding SABMs, and thereby detect mapped traffic channels, allowing the system to monitor the communication of the next call, notwithstanding the miss of RACH message.

The description above, referred to a scenario where notwithstanding the lost of RACH message, the system is capable to detect mapped traffic channels and monitor the communications transmitted there through. (using in accordance with certain embodiments correspondence between AGCH/SABM signals.)

It is, however, desirable in accordance with certain embodiments to trace also the "lost" RACH message since, it will allow to identify subsequent RACH messages initiated by the same MES (and obtain from the new RACH, important information such as MES location). Once the new RACH channel is found, it will allow to intercept the RACH messages until next re-mapping occurs.

Figure 11:
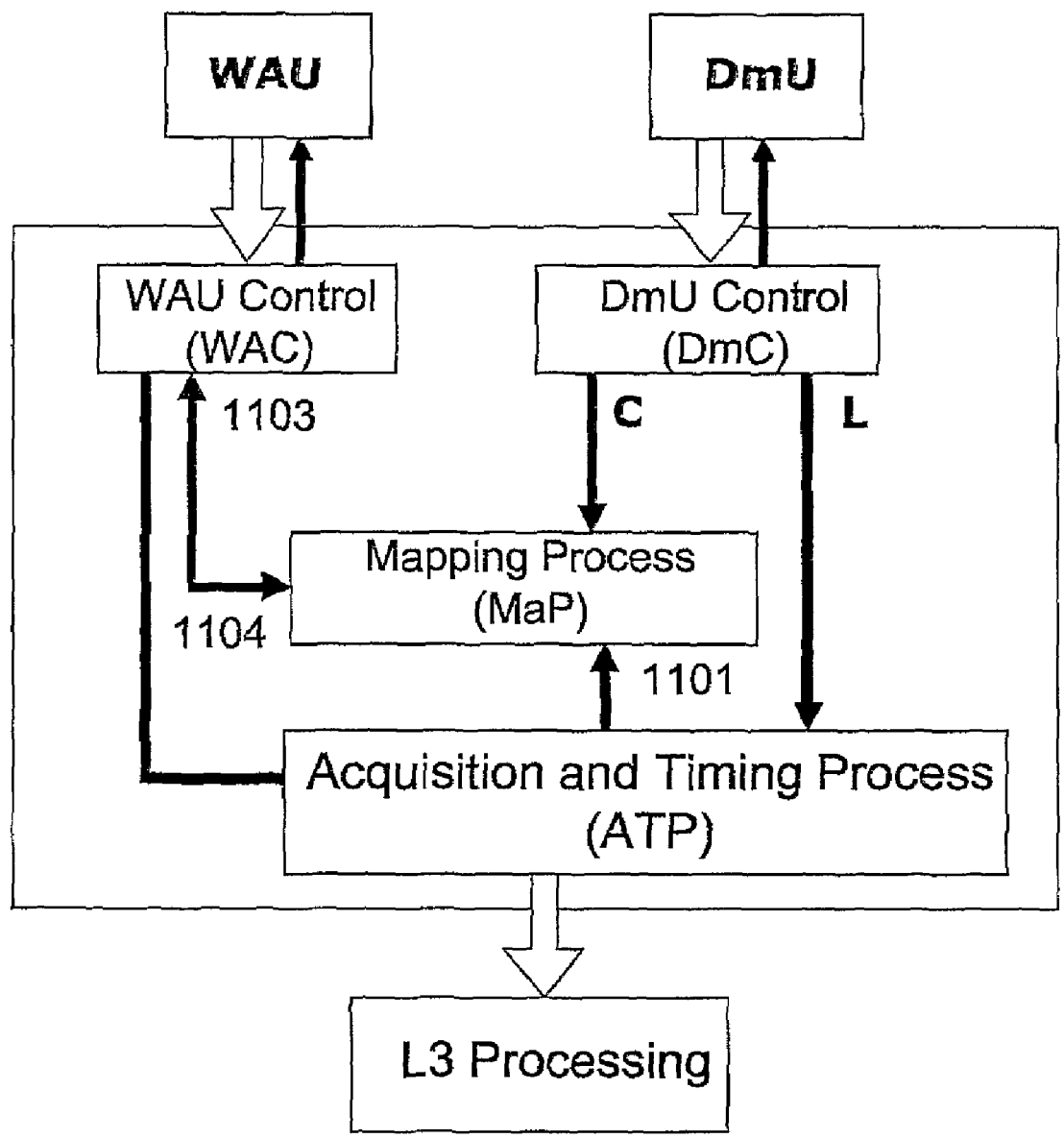
FIG. 11 illustrates a mapping sequence, in accordance with another embodiment of the invention.

Bearing this in mind, attention is drawn to FIG. 11, illustrating a scenario to identify lost RACH, in accordance with certain embodiment and with reference to the architecture of FIG. 4. The underlying assumption in accordance with this embodiment is that the WAU has logged the energy activity (including the timestamp) across the C band channels (see e.g. description with reference to FIG. 5A above). Accordingly, there is a need to correlate energy activity across the C band that happened in a timeslot similar to that of the AGCH message. This would allow to identify candidate RACH channels, allocate demodulators thereto and identify the new RACH messages which will be transmitted through one of the candidate RACH channels.

Thus, in accordance with one embodiment:

1101. If an AGCH message was received by the MaP, and there is no matching RACH message received earlier, the MaP attempts to trace the corresponding RACH frequency.

1102. MaP examines the additional parameter derived from and added to the AGCH message by the ATP—the timestamp in which the corresponding RACH message was received by the network 1103. MaP requests from the WAC a list of RACH frequencies, which were activated at (or near) the specified timestamp 1104. WAC examines C-band activity log and returns list of activated RACH frequencies 1105. MaP sets high mapping priority to the RACH frequencies received from the WAC (including allocating demodulators thereto). These channels are likely to have in the future RACH signal that corresponds to the AGCH signal.

The present invention has been described with a certain degree of particularity, but those versed in the art will readily appreciate that various alterations and modifications may be carried out without departing from the scope of the following claims.

The invention claimed is:

1. A method for intercepting and monitoring of cellular satellite communication wherein communication between at least one mobile device (MES) and the satellite is through a first band link that includes plurality of first-band spot beams each accommodating at least one basic channel unit that includes a control channel and corresponding traffic channels, and communication between the satellite and main station is through wideband second-band link accommodating plurality of second band spot beams each accommodating at least one basic channel unit that includes a control channel and corresponding traffic channels, wherein the satellite employs a mapping scheme between the first band and the second band, the method comprising detecting an actual mapping between a control channel of the downlink first band link and corresponding control channel of downlink second band link by identifying identical unique spot beam number (SB_Mask) data in the respective control channels.

2. The method according to claim 1, wherein said detecting includes:
   i) finding Broadcast control Channel (BCCH) constituting said control channel of the downlink first band, and identifying SB_Mask signals derived there from;
   ii) finding at least one Random Access Control Channel (RACH) in downlink second band link according to a predetermined criterion, and identifying respective SB_Mask data derived therefrom;
   iii) identifying identical SB-Mask signals in said BCCH and RACH channels; the RACH, from among said at least one RACH, with the identified SB-Mask being the control channel of the downlink second band.

3. The method according to claim 2, wherein said finding BCCH includes identifying BCCH and measuring BCCH rate of calls and wherein finding RACH includes measuring substantially simultaneously energy of plurality of signals in respective channels of said downlink second band and wherein said criterion includes analyzing the measured energy to identify RACH signals at a rate that matches said BCCH rate of calls, and wherein said identifying SB_Mask signal includes analyzing the SB MASK data in said found BCCH and RACH signals for identifying the identical SB_Mask data.

4. The method according to claim 3, wherein said measuring BCCH rate of calls includes measuring rate of Access Grant signals (AGCH) per time unit.

5. The method according to claim 2, further comprising extracting data from the RACH signal of the control channel.

6. The method according to claim 5, wherein said extracted data includes GPS data indicative of the geographical location of the MES.

7. The method according to claim 1, further comprising finding an Access Grant (AGCH) signal in the control channel of said downlink first band and identifying corresponding RACH signal in the control channel in said downlink second band; said identifying including determining identical request reference signal in said AGCH and RACH signals.

8. The method according to claim 1, further comprising detecting an actual mapping between traffic channels in said downlink second link and downlink first link that correspond to said control channels.

9. The method according to claim 8, wherein said detecting includes switching to a traffic channel in said first band according to data extracted from an Access Grant (AGCH) signal found in said downlink first band, and identifying corresponding Asynchronous Balanced Mode (SABM) signal in a channel in the downlink second band link according to a predetermined criterion; the latter channel being the traffic channel in said downlink second band.

10. The method according to claim 9, wherein said identifying includes measuring substantially simultaneously energy bursts in channels of said downlink second band link and wherein said criterion includes identifying at least one channel in which the respective energy burst is at first timing substantially identical to a second timing of said (AGCH) signal, and for said at least one channels identifying a channel with a sequence of SABM signals; the latter channel constituting said traffic channel in the downlink second band link.

11. The method according to claim 8, further comprising processing communication in said traffic channels.

12. The method according to claim 11, wherein said processing includes applying decryption and demodulation to said communication giving rise to plain media data.

13. The method according to claim 1, wherein said first band is an L band and said second band is a C band.

14. The method according to claim 1, wherein said satellite is an Aces satellite.

15. A method for intercepting and monitoring of cellular satellite communication wherein communication between at least one mobile device (MES) and the satellite is through a first band link that includes plurality of first-band channels, and communication between the satellite and main station is through wideband second band link that include plurality of second-band channels, wherein the satellite employs a mapping scheme between the first band and the second band, the method comprising detecting an actual mapping between a channel of the downlink first band link and corresponding channel of downlink second band link by identifying identical unique spot beam number (SB_Mask) data in the respective control channels.

16. The method according to claim 15, further comprising detecting an actual mapping between traffic channels in said downlink second link and downlink first link that correspond to said control channels.

17. The method according to claim 16, further comprising processing communication in said traffic channels.

18. The method according to claim 17, wherein said processing includes applying decryption and demodulation to said communication giving rise to plain media data.

19. The method according to claim 15, wherein said first band is an L band and said second band is a C band.

20. The method according to claim 15, wherein said satellite is an Aces satellite.

21. A method for intercepting and monitoring of cellular satellite communication wherein communication between at least one mobile device (MES) and the satellite is through first band link that includes plurality of first band spot beams each accommodating at least one basic channel unit that includes a control channel and corresponding traffic channels, and communication between the satellite and main station is through wideband second-band link accommodating plurality of first band spot beams each accommodating at least one basic channel unit that includes a control channel and corresponding traffic channels, wherein the satellite employs a mapping scheme between the first band and the second band, the method comprising detecting an actual mapping between traffic channels in said downlink second link and downlink first link that correspond to said control channels, including finding an access grant (AGCH) signal at a first timing in said downlink first band and identifying a corresponding traffic channel in the downlink second band link by identifying an Asynchronous Balanced Mode (SABM) signal at a second timing that corresponds to said first timing.

22. The method according to claim 21, wherein said detecting includes switching to a traffic channel in said first band according to data extracted from an Access Grant (AGCH) signal found in said downlink first band, and identifying corresponding SABM signal in a channel in the downlink second band link according to a predetermined criterion; the latter channel being the traffic channel in said downlink second band.

23. The method according to claim 22, wherein said identifying includes measuring substantially simultaneously energy bursts in channels of said downlink second band link and wherein said criterion includes identifying at least one channel in which the respective energy burst is at first timing substantially identical to a second timing of said AGCH, and for said at least one channels identifying a channel with a sequence of SABM signals; the latter channel constituting said traffic channel in the downlink C band link.

24. The method according to claim 21, further comprising, processing the communication in said corresponding traffic channels.

25. The method according to claim 24, wherein said processing includes applying decryption and demodulation to said communication giving rise to plain media data.

26. The method according to claim 21, wherein said first band is an L band and said second band is a C band.

27. The method according to claim 21, said satellite is an Aces satellite.

28. A method for intercepting and monitoring of cellular satellite communication wherein communication between at least one mobile device (MES) and the satellite is through first band link that includes plurality of first band channels, and communication between the satellite and main station is through wideband second-band link that include plurality of second-band channels, and wherein said satellite maps dynamically a channel in the first band to a channel in the second band according to a mapping scheme, the method comprising:

detecting an actual mapping between a channel of the downlink first band link and corresponding channel of downlink second band link, irrespective of said dynamic mapping.

29. The method according to claim 28, wherein said detecting includes identifying identical unique spot beam number (SB_Mask) data in the respective control channels.

30. The method according to claim 28, further comprising detecting an actual mapping between traffic channels in said downlink second link and downlink first link that correspond to said control channels.

31. The method according to claim 28, wherein said first-band is an L band and said second band is a C band.

32. A method for intercepting and monitoring of satellite communication wherein communication between at least one mobile device (MES) and the satellite is through a first band link that includes plurality of first-band channels, and communication between the satellite and main station is through wideband second-band link that include plurality of second-band channels, wherein the satellite employs a mapping scheme between the first band and the second band, the method comprising (i) detecting an actual mapping between a control channel of the downlink first band link and corresponding control channel of said downlink second band link; and
 (ii) detecting an actual mapping between a traffic channel associated with the control channel of said downlink first band link and a traffic channel associated with the control channel of said second-band link.

33. The method according to claim 32, wherein said detecting (i) includes
 (1) finding Broadcast control Channel (BCCH) of said control channel of the downlink first band, and
 (2) finding a corresponding Random Access Control Channel (RACH) in said downlink second band link.

34. The method according to claim 32, wherein said detecting (ii) includes:
 finding an Access Grant signal (AGCH) in said control channel of the downlink first band which AGCH corresponding to said RACH, and based on the AGCH data, identifying a traffic channel associated with the control channel of said downlink first band link.

35. The method according to claim 33, further comprising extracting a spot beam number (SB_Mask) data from said BCCH and extracting a spot beam number (SB_Mask) data from said RACH, and in the case of identity between said extracted SB-Masks, determining that said BCCH corresponds to said RACH.

36. The method according to claim 34, further comprising extracting a request reference signal from said RACH and extracting a request reference signal from said AGCH, and in the case of identity between said extracted request reference signal, determining that said AGCH corresponds to said RACH.

37. The method according to claim 32, further comprising processing communication in said traffic channels.

38. The method according to claim 37, wherein said processing includes applying decryption and demodulation to said communication giving rise to plain media data.

39. The method according to claim 32, wherein said first-band is an L band and said second band is a C band.

40. The method according to claim 32, wherein the satellite allocating additional at least one control and associated traffic channels to a spot, the method further comprising
   (i) detecting an actual mapping between additional control channel of the downlink first band link and corresponding additional control channel of said downlink second band link;
   (ii) detecting an actual mapping between additional traffic channel associated with the additional control channel of said downlink first band link and additional traffic channel associated with the additional control channel of said second-band link.

41. A system for intercepting and monitoring of cellular satellite communication wherein communication between at least one mobile device (MES) and the satellite is through a first band link that includes plurality of first-band spot beams each accommodating at least one basic channel unit that includes a control channel and corresponding traffic channels, and communication between the satellite and main station is through wideband second-band link accommodating plurality of second band spot beams each accommodating at least one basic channel unit that includes a control channel and corresponding traffic channels, wherein the satellite employs a mapping scheme between the first band and the second band, the system comprising apparatus configured to detect an actual mapping between a control channel of the downlink first band link and corresponding control channel of downlink second band link by identifying identical unique spot beam number (SB_Mask) data in the respective control channels.

42. A system for intercepting and monitoring of cellular satellite communication wherein communication between at least one mobile device (MES) and the satellite is through a first band link that includes plurality of first-band channels, and communication between the satellite and main station is through wideband second-band link that include plurality of second-band channels, wherein the satellite employs a mapping scheme between the first band and the second band, the system comprising apparatus configured to detect an actual mapping between a channel of the downlink first band link and corresponding channel of downlink second band link by identifying identical unique spot beam number (SB_Mask) data in the respective control channels.

43. A system for intercepting and monitoring of cellular satellite communication wherein communication between at least one mobile device (MES) and the satellite is through first band link that includes plurality of first-band spot beams each accommodating at least one basic channel unit that includes a control channel and corresponding traffic channels, and communication between the satellite and main station is through wideband second-band link accommodating plurality of first band spot beams each accommodating at least one basic channel unit that includes a control channel and corresponding traffic channels, wherein the satellite employs a mapping scheme between the first band and the second band, the system comprising apparatus configured to detect an actual mapping between traffic channels in said downlink second link and downlink first link that correspond to said control channels, including finding an access grant (AGCH) signal at a first timing in said downlink first band and identifying a corresponding traffic channel in downlink second band link by identifying an Asynchronous Balanced Mode (SABM) signal at a second timing that corresponds to said first timing.

44. A system for intercepting and monitoring of cellular satellite communication wherein communication between at least one mobile device (MES) and the satellite is through first band link that includes plurality of first-band Channels, and communication between the satellite and main station is through wideband second-band link that include plurality of second-band channels, and wherein said satellite maps dynamically a channel in the first band to a channel in the second according to a mapping scheme, the system comprising apparatus configured to detect an actual mapping between a channel of the downlink first band link and corresponding channel of downlink second band link, irrespective of said dynamic mapping.

45. A system for intercepting and monitoring of satellite communication wherein communication between at least one mobile device (MES) and the satellite is through a first band link that includes plurality of first-band channels, and communication between the satellite and main station is through wideband second-band link that include plurality of second-band channels, wherein the satellite employs mapping scheme between the first band and the second band, the system comprising apparatus being configured to detect an actual mapping between a control channel of the downlink first band link and corresponding control channel of said downlink second band link; the apparatus being further configured to detect an actual mapping between a traffic channel associated with the control channel of said downlink first band link and a traffic channel associated with the control channel of said second-band link.

46. A computer program product comprising a non-transitory computer readable medium having computer readable program code embodied therein for intercepting and monitoring of cellular satellite communication wherein communication between at least one mobile device (MES) and the satellite is through a first band link that includes plurality of first-band spot beams each accommodating at least one basic channel unit that includes a control channel and corresponding traffic channels, and communication between the satellite and main station is through wideband second-band link accommodating plurality of second band spot beams each accommodating at least one basic channel unit that includes a control channel and corresponding traffic channels, wherein the satellite employs a mapping scheme between the first band and the second band, the computer program product comprising:
   computer readable program code for causing the computer to detect an actual mapping between a control channel of the downlink first band link and corresponding control channel of downlink second band link by identifying identical unique spot beam number (SB_Mask) data in the respective control channels.

47. A computer program product comprising a non-transitory computer readable medium having computer readable program code embodied therein for intercepting and monitoring of cellular satellite communication wherein communication between at least one mobile device (MES) and the satellite is through a first band link that includes plurality of first-band channels, and communication between the satellite and main station is through wideband second-band link that include plurality of second-band channels, wherein the satellite employs a mapping scheme between the first band and the second band, the computer program product comprising:

computer readable program code for causing the computer to detect an actual mapping between a channel of the downlink first band link and corresponding channel of downlink second band link by identifying identical unique spot beam number (SB_Mask) data in the respective control channels.

48. A computer program product comprising a non-transitory computer readable medium having computer readable program code embodied therein for intercepting and monitoring of cellular satellite communication wherein communication between at least one mobile device (MES) and the satellite is through first band link that includes plurality of first-band spot beams each accommodating at least one basic channel unit that includes a control channel and corresponding traffic channels, and communication between the satellite and main station is through wideband second-band link accommodating plurality of first band spot beams each accommodating at least one basic channel unit that includes a control channel and corresponding traffic channels, wherein the satellite employs mapping scheme between the first band and the second band, the computer program product comprising:

computer readable program code for causing the computer to detect an actual mapping between traffic channels in said downlink second link and downlink first link that correspond to said control channels, including computer readable program code for causing the computer to find an access grant (AGCH) signal at a first timing in said downlink first band and to identify a corresponding traffic channel in downlink second band link by identifying an SABM signal at a second timing that corresponds to said first timing.

49. A computer program product comprising a non-transitory computer readable medium having computer readable program code embodied therein for intercepting and monitoring of cellular satellite communication wherein communication between at least one mobile device (MES) and the satellite is through first band link that includes plurality of first-band channels, and communication between the satellite and main station is through wideband second-band link that include plurality of second-band channels, and wherein said satellite maps dynamically a channel in the first band to a channel in the second band according to a mapping scheme, the computer program product comprising:

computer readable program code for causing the computer to detect an actual mapping between a channel of the downlink first band link and corresponding channel of downlink second band link, irrespective of said dynamic mapping.

50. A computer program product comprising a non-transitory computer readable medium having computer readable program code embodied therein for intercepting and monitoring of satellite communication wherein communication between at least one mobile device (MES) and the satellite is through a first band link that includes plurality of first-band channels, and communication between the satellite and main station is through wideband second-band link that include plurality of second-band channels, wherein the satellite employs a mapping scheme between the first band and the second band, the computer program product comprising:

(i) computer readable program code for causing the computer to detect an actual mapping between a control channel of the downlink first band link and corresponding control channel of said downlink second band link; and (ii) computer readable program code for causing the computer to detect an actual mapping between a traffic channel associated with the control channel of said downlink first band link and a traffic channel associated with the control channel of said second-band link.

\* \* \* \* \*

UNITED STATES PATENT AND TRADEMARK OFFICE
CERTIFICATE OF CORRECTION

| | |
|---|---|
| PATENT NO. | : 8,406,685 B2 |
| APPLICATION NO. | : 11/912211 |
| DATED | : March 26, 2013 |
| INVENTOR(S) | : Giloh |

It is certified that error appears in the above-identified patent and that said Letters Patent is hereby corrected as shown below:

On the Title Page of the issued patent under item (54) in the title and in the Specification, Col. 1, lines 1-3, please insert the word --DATA-- at the end of the title so that it may read as...

--SYSTEM AND METHOD FOR INTERCEPTING CELLULAR SATELLITE COMMUNICATION DATA--

Signed and Sealed this
Eighth Day of October, 2013

Teresa Stanek Rea
*Deputy Director of the United States Patent and Trademark Office*